(12) United States Patent
Orimo et al.

(10) Patent No.: US 10,723,840 B2
(45) Date of Patent: *Jul. 28, 2020

(54) POLYPHENYLENE ETHER AND RESIN COMPOSITION

(71) Applicant: ASAHI KASEI KABUSHIKI KAISHA, Chiyoda-ku, Tokyo (JP)

(72) Inventors: Chihiro Orimo, Tokyo (JP); Toru Yamaguchi, Tokyo (JP); Mihoko Yamamoto, Tokyo (JP); Akira Mitsui, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 16/068,191

(22) PCT Filed: Oct. 3, 2016

(86) PCT No.: PCT/JP2016/004461
§ 371 (c)(1),
(2) Date: Jul. 5, 2018

(87) PCT Pub. No.: WO2017/119017
PCT Pub. Date: Jul. 13, 2017

(65) Prior Publication Data
US 2019/0002637 A1    Jan. 3, 2019

(30) Foreign Application Priority Data
Jan. 8, 2016    (JP) .................................. 2016-002942

(51) Int. Cl.
*C08G 65/48* (2006.01)
*C08L 25/04* (2006.01)
*C08L 71/12* (2006.01)
*C08G 65/38* (2006.01)

(52) U.S. Cl.
CPC ........... *C08G 65/485* (2013.01); *C08G 65/38* (2013.01); *C08L 25/04* (2013.01); *C08L 71/12* (2013.01)

(58) Field of Classification Search
None
See application file for complete search history.

(56) References Cited

U.S. PATENT DOCUMENTS

| 4,837,276 A | 6/1989 | Fuhr et al. |
| 2005/0075472 A1 | 4/2005 | Yeager et al. |
| 2006/0106139 A1 | 5/2006 | Kosaka et al. |
| 2010/0139944 A1 | 6/2010 | Guo et al. |
| 2010/0292376 A1* | 11/2010 | Timberlake .......... C08K 5/5397 524/129 |
| 2015/0166788 A1 | 6/2015 | Li et al. |

FOREIGN PATENT DOCUMENTS

| CN | 103709717 A | 4/2014 |
| JP | S63186734 A | 8/1988 |
| JP | H02274761 A | 11/1990 |
| JP | H03292363 A | 12/1991 |
| JP | 04088018 A * | 3/1992 |
| JP | H0488018 A | 3/1992 |
| JP | H04117452 | 4/1992 |
| JP | 09176304 A * | 7/1997 |
| JP | H09176304 A | 7/1997 |
| JP | H09176305 A | 7/1997 |
| JP | 2001302791 A | 10/2001 |
| JP | 2009221387 | 10/2009 |
| JP | 2012153832 A | 8/2012 |
| JP | 2012251039 A | 12/2012 |
| JP | 2013023517 A | 2/2013 |
| JP | 2013023517 A * | 2/2013 |
| JP | 2013023519 A | 2/2013 |
| JP | 2016176072 A | 10/2016 |

OTHER PUBLICATIONS

Lin et al., "Catalyst-free synthesis of phosphinated poly(2,6-dimethyl-1,4-phenylene oxide) with high-Tg and low-dielectric characteristics," Polymer Degradation and Stability, vol. 99, pp. 105-110 (2014) (Year: 2014).*
Database CA [Online] Chemical Abstracts Service, Columbus, Ohio, US; Kitai, Yuki et al: "Poly (phenylene ether) resin compositions with good fire resistance and dielectric properties and varnishes therefrom", XP002788399, retrieved from STN Database accession No. 2013:175762, 2013.
Feb. 26, 2019, the Supplementary European Search Report issued by the European Patent Office in the corresponding European Patent Application No. 16883523.9.
Jul. 10, 2018, International Preliminary Report on Patentability issued in the International Patent Application No. PCT/JP2016/004461.
Jul. 24, 2018, the Supplementary European Search Report issued by the European Patent Office in the European Patent Application No. 16861761.1.
Ching Hsuan Lin et al., Catalyst-free synthesis of phosphinated poly(2,6-dimethyl-1,4-phenylene oxide) with high-Tg and low-dielectric characteristic, Polymer Degradation and Stability, 2014, pp. 105-110, vol. 99.
May 8, 2018, International Preliminary Report on Patentability issued in the International Patent Application No. PCT/JP2016/004460.
Nov. 22, 2016, International Search Report issued in the International Patent Application No. PCT/JP2016/004461.

* cited by examiner

*Primary Examiner* — Rachel Kahn
*Assistant Examiner* — Ha S Nguyen
(74) *Attorney, Agent, or Firm* — Kenja IP Law PC

(57) ABSTRACT

Provided is a polyphenylene ether resin composition having excellent heat aging resistance and fluidity. A polyphenylene ether includes at least one structural unit selected from chemical formulae (1), (2), and (3).

8 Claims, No Drawings

POLYPHENYLENE ETHER AND RESIN COMPOSITION

TECHNICAL FIELD

This disclosure relates to a polyphenylene ether and a resin composition having excellent heat aging resistance properties.

BACKGROUND

Polyphenylene ether resins are widely used as materials for home appliances, OA devices, office machines, information devices, automobiles, and so forth due to having various properties such as excellent mechanical properties, electrical properties, acid/alkali resistance, and heat resistance, low specific gravity and water absorbency, and good dimensional stability. In recent years, polyphenylene ether resin compositions have also been investigated in relation to applications as reflecting shaped articles for use in projectors, various lighting fixtures, and so forth, and as thin automotive components. Components for use in such applications are required to have thin wall molding fluidity and also, in many cases, long-term thermal stability (heat aging resistance properties) under a certain level of high temperature conditions since these components may be exposed to high temperature over a long time.

However, it is not necessarily the case that polyphenylene ethers innately have adequate thin wall molding fluidity and heat aging resistance properties.

Examples of techniques for enhancing heat aging resistance properties of a polyphenylene ether resin include a technique of using a sulfuric antioxidant and a hindered phenol antioxidant in combination in a specific quantitative ratio (for example, PTL 1). A technique of using an organic sulfuric antioxidant and a specific amine in combination in a specific ratio has also been disclosed (for example, PTL 2).

CITATION LIST

Patent Literature

PTL 1: JP 2009-221387 A
PTL 2: JP H2-274761 A

SUMMARY

Technical Problem

However, although resin compositions produced by the methods described in PTL 1 and 2 enable enhancement of heat aging properties at low temperature over a short time, they do not provide adequate heat aging resistance properties at high temperature over a long time, such as at 135° C. for 1,500 hours. Moreover, the resin compositions described above do not have adequate shaping fluidity in shaping, and surface roughness due to fine gas escape marks that are characteristic of polyphenylene ether resins are observed in shaped articles thereof, which presents a problem in terms of poor external appearance in applications such as for reflecting shaped products. Furthermore, when a sulfuric antioxidant is used as in PTL 1 and 2, this may lead to problems such as corrosion of metal parts located in proximity to a shaped article. Also, a resin composition obtained by the method described in PTL 2 gives off an odor (amine odor) during shaping, and thus requires further improvement.

This disclosure is made in light of the circumstances set forth above and aims to provide a polyphenylene ether and a resin composition having excellent heat aging resistance properties.

Solution to Problem

Through diligent investigation conducted with the aim of solving the problems set forth above, the inventors discovered that an oxidative crosslinking reaction occurs in a polyphenylene ether resin when polyphenylene ether is exposed to high temperature over a long time, for example, and that this oxidative crosslinking reaction has a significant effect of reducing heat aging resistance properties of the polyphenylene ether. In addition, the inventors conducted diligent investigation into the cause of this oxidative crosslinking reaction and thereby discovered that terminal substituents and side chain substituents in the polyphenylene ether chain are susceptible to oxidative crosslinking reaction. The inventors found that oxidative crosslinking of a polyphenylene ether resin can be inhibited and heat aging resistance properties can be enhanced to a remarkably high level that has not previously been achieved through inclusion of a specific structural unit in the polyphenylene ether chain, and thereby completed this disclosure.

[1] A polyphenylene ether comprising at least one structural unit selected from chemical formulae (1), (2), and (3),

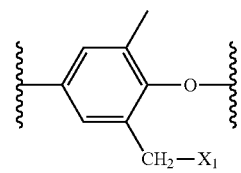

(1)

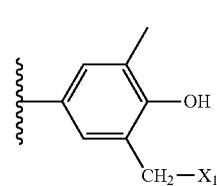

(2)

wherein $X_1$ in chemical formulae (1) and (2) is a group selected from the group consisting of

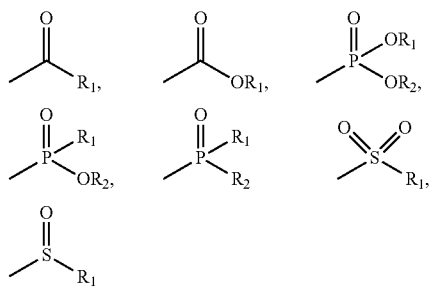

where $R_1$ and $R_2$ in $X_1$ are each, independently of one another, a substituent having a carbon number of 1 or more,

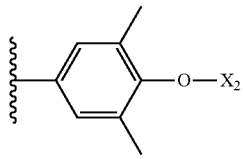

(3)

and $X_2$ in chemical formula (3) is a group selected from the group consisting of

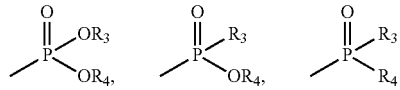

where $R_3$ and $R_4$ in $X_2$ are each, independently of one another, a group selected from the group consisting of a hydrogen atom, an alkyl group, an aryl group, an alkylamino group, and an arylamino group, $R_3$ and $R_4$ may form a cyclic structure through bonding of carbon atoms included therein, and chemical formula (3) does not substantially include an unsaturated double bond other than an aromatic ring unsaturated double bond.

[2] The polyphenylene ether according to [1], wherein $X_1$ is a group selected from the group consisting of

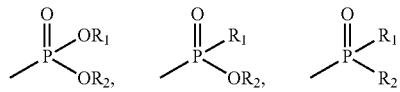

in chemical formulae (1) and (2).

[3] The polyphenylene ether according to [1] or [2], wherein 0.01 structural units to 10.0 structural units selected from the group consisting of chemical formulae (1), (2), and (3) are included per 100 monomer units forming the polyphenylene ether.

[4] The polyphenylene ether according to any one of [1] to [3],
wherein
a ratio of structural units represented by chemical formula (1) relative to structural units represented by chemical formula (2) is 0 mol % to 30 mol %.

[5] The polyphenylene ether according to any one of [1] to [4], comprising:
either or both of a structural unit represented by chemical formula (1) and a structural unit represented by chemical formula (2); and
a structural unit represented by chemical formula (3).

[6] A resin composition comprising:
(A) the polyphenylene ether according to any one of [1] to [5]; and
(B) an antioxidant, wherein
0.1 parts by mass to 5.0 parts by mass of (B) the antioxidant is contained per 100 parts by mass of (A) the polyphenylene ether.

[7] The resin composition according to [6], wherein (B) the antioxidant is a phosphoric antioxidant.

[8] The resin composition according to [6] or [7], further comprising
(C) a styrenic resin.

Advantageous Effect

According to this disclosure, it is possible to provide a polyphenylene ether and a resin composition having excellent heat aging resistance properties. Moreover, according to this disclosure, it is possible to provide a polyphenylene ether and a resin composition that can be included in thermoplastic resin shaped articles that are applicable for electrical and electronic components, automotive components, and so forth that are required to have heat resistance and high heat aging resistance.

DETAILED DESCRIPTION

The following provides a detailed description of an embodiment (hereinafter, referred to simply as the "present embodiment") of a polyphenylene ether and a resin composition containing the polyphenylene ether according to this disclosure.

[(A) Polyphenylene Ether]

The following describes (A) a polyphenylene ether (hereinafter, polyphenylene ether is also referred to simply as "PPE") according to this disclosure.

The presently disclosed (A) polyphenylene ether is a homopolymer or copolymer including a repeating unit (structural unit) represented by chemical formula (4), shown below, and/or a repeating unit (structural unit) represented by chemical formula (5), shown below.

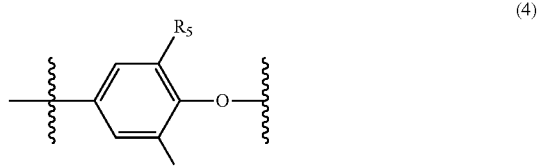

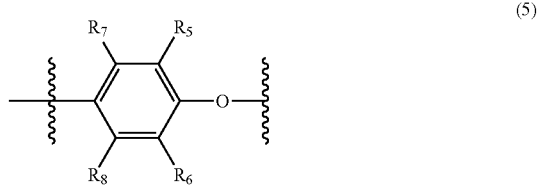

In chemical formulae (4) and (5), $R_5$, $R_6$, $R_7$, and $R_8$ each represent, independently of one another, a hydrogen atom, an alkyl group having a carbon number of 1 to 4, an aryl group having a carbon number of 6 to 9, or a halogen atom, with the proviso that $R_5$ and $R_6$ are not both hydrogen.

Representative examples of polyphenylene ether homopolymers that can be used include poly(2,6-dimethyl-1,4-phenylene) ether, poly(2-methyl-6-ethyl-14-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chloroethyl-1,4-phenylene) ether, poly(2-methyl-6-hydroxyethyl-1,4-phenylene) ether, and poly(2-methyl-6-chloroethyl-1,4-phenylene) ether.

The polyphenylene ether copolymer is a copolymer having a repeating unit represented by chemical formula (4) and/or a repeating unit represented by chemical formula (5) as a main repeating unit. Examples of polyphenylene ether copolymers that can be used include a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol, and o-cresol.

Among polyphenylene ethers, poly(2,6-dimethyl-1,4-phenylene) ether is preferable.

Note that in the present embodiment, a structure in which $R_5$ and $R_6$ in chemical formula (4) are both methyl groups (and a structure derived therefrom as described further below) is included in at least part of the polyphenylene ether chain.

The reduced viscosity (units: dL/g; measurement of chloroform solution at 30° C.) of the polyphenylene ether is preferably within a range of 0.25 to 0.6, and more preferably within a range of 0.35 to 0.55. The number average molecular weight (Mn) of the polyphenylene ether is preferably 10,000 or more, and more preferably 14,000 or more, and is preferably 20,000 or less, and more preferably 19,000 or less. The molecular weight ranges set forth above provide an excellent balance of flame retardance, fluidity, close adherence to a filler, and so forth.

In general, (A) the polyphenylene ether can be acquired as a powder that, in terms of particle size, preferably has an average particle diameter of 1 μm to 1,000 μm, more preferably 10 μm to 700 μm, and particularly preferably 100 μm to 500 μm. An average particle diameter of 1 μm or more is preferable from a viewpoint of ease of handling during processing and an average particle diameter of 1,000 μm or less is preferable in order to inhibit the occurrence of unmelted matter in melt-kneading.

The presently disclosed (A) polyphenylene ether includes at least one structural unit selected from chemical formulae (1), (2), and (3), shown below.

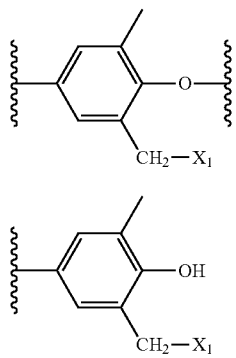

$X_1$ in chemical formulae (1) and (2) is a group selected from the group consisting of

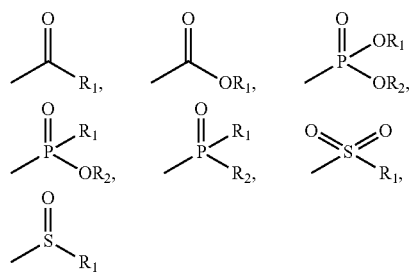

where $R_1$ and $R_2$ in $X_1$ are each, independently of one another, a substituent having a carbon number of 1 or more, such as a linear or cyclic alkyl group.

A substituent that does not have a reactive functional group is preferable as the structure of $R_1$ and $R_2$. This is because in a situation in which reactive substituents are included, a crosslinking reaction of the reactive substituents may occur upon long-term exposure of a resin composition to high temperature, which may cause deterioration of post-aging physical properties. Examples of reactive substituents include a hydroxy group, an alkoxy group, an amino group, a vinyl group, and a carbonyl group. Moreover, the structure of $R_1$ and $R_2$ may be a structure in which $R_1$ and $R_2$ are linked or a structure including a nitrogen atom and/or an oxygen atom.

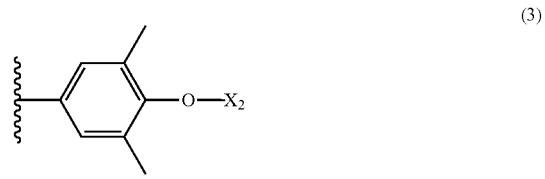

$X_2$ in chemical formula (3) is a group selected from the group consisting of

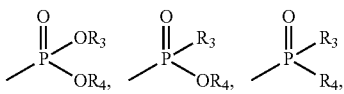

where $R_3$ and $R_4$ in $X_2$ are each, independently of one another, a group selected from the group consisting of a hydrogen atom, an alkyl group, an aryl group, an alkylamino group, and an arylamino group.

Moreover, $R_3$ and $R_4$ may form a cyclic structure through bonding of carbon atoms included therein. However, formula (3) does not substantially include an unsaturated double bond other than an aromatic ring unsaturated double bond. More precisely, formula (3) does not substantially include a carbon-carbon double bond other than an aromatic ring double bond.

Examples of alkyl groups that may be represented by $R_3$ and $R_4$ include alkyl groups having a carbon number of 1 to 30 and, more specifically, a methyl group, an ethyl group, an n-propyl group, an i-propyl group, an n-butyl group, a t-butyl group, a hexyl group, a cyclohexyl group, an octyl group, a decyl group, a dodecyl group, a hexadecyl group, and an octadecyl group.

Examples of aryl groups that may be represented by $R_3$ and $R_4$ include aryl groups having a carbon number of 6 to 30 and, more specifically, a phenyl group, a tolyl group, a dimethylphenyl group, a trimethylphenyl group, a naphthyl group, and a trityl group.

Examples of the alkyl group in the aforementioned alkylamino group include alkyl groups having a carbon number of 1 to 30 and, more specifically, a methyl group, an ethyl group, an n-propyl group, an i-propyl group, a butyl group, a hexyl group, a cyclohexyl group, an octyl group, a decyl group, a dodecyl group, a hexadecyl group, and an octadecyl group. Examples of the alkylamino group include a methylamino group, a dimethylamino group, an ethylamino group, a diethylamino group, an isopropylamino group, a diisopropylamino group, a butylamino group, a dibutylamino group, an octylamino group, and a dioctylamino group. Examples of the aforementioned arylamino group include a phenylamino group, a diphenylamino group, a tolylamino group, and a ditolylamino group.

The presently disclosed (A) polyphenylene ether may be a polyphenylene ether that includes at least one structural unit selected from chemical formulae (1) and (2).

The presently disclosed (A) polyphenylene ether may be a polyphenylene ether that includes a structural unit represented by chemical formula (3).

Moreover, the presently disclosed (A) polyphenylene ether preferably includes: either or both of a structural unit represented by chemical formula (1) and a structural unit represented by chemical formula (2); and a structural unit represented by chemical formula (3).

The following describes the action and effect of the presently disclosed polyphenylene ether.

When a conventional polyphenylene ether is exposed to high temperature over a long time, methyl groups in terminal units (hereinafter, also referred to as "terminal methyl groups"), methyl groups in intermediate units (hereinafter, also referred to as "side chain methyl groups"), and hydroxy groups in terminal units (hereinafter, also referred to as "terminal hydroxy groups") may cause an oxidative crosslinking reaction, which has a significant effect of reducing heat aging resistance properties of the polyphenylene ether and a resin composition thereof. More specifically, generation of radicals occurs comparatively easily at terminal methyl groups, side chain methyl groups, and terminal hydroxy groups, and the generated radicals act as a cause of oxidative crosslinking. However, in the presently disclosed polyphenylene ether, terminal methyl groups, side chain methyl groups, and terminal hydroxy groups that act as oxidation sites are in a blocked state through substitution with a specific molecule. This can inhibit crosslinking reaction of the terminal methyl groups, side chain methyl groups, and terminal hydroxy groups, and thereby improve heat aging resistance properties of the polyphenylene ether. Moreover, as a result of terminal methyl groups, side chain methyl groups, and terminal hydroxy groups being in a blocked state through substitution with a specific molecule in (A) the polyphenylene ether according to the present embodiment, it is possible to inhibit changes in structure at terminals (terminal methyl groups and terminal hydroxy groups) of a molecular chain while a resin composition in which the PPE is used is in an extruder or shaping machine, and thus it is possible to improve heat aging resistance properties while also preventing coloring and improving external appearance of a shaped article. It is preferable that blocking with a specific molecule is performed to a greater degree at the terminals because terminal methyl groups and terminal hydroxy groups have greater radical generating ability as oxidation sites than side chain methyl groups.

In the chain of (A) the polyphenylene ether, the number of structural units selected from the group consisting of chemical formulae (1), (2), and (3) that are included per 100 monomer units forming the polyphenylene ether is preferably 0.01 units to 10.0 units, and more preferably 0.03 units to 5.0 units from a viewpoint of heat aging resistance properties and mechanical properties.

Moreover, the ratio of structural units represented by chemical formula (1) relative to structural units represented by chemical formula (2) is preferably 0 mol % to 30 mol %, and more preferably 0 mol % to 28 mol % from a viewpoint of heat aging resistance properties and mechanical properties.

This ratio can be adjusted to within any of the ranges set forth above through adjustment of the type of a subsequently described reactive compound, the reaction temperature, stirring efficiency, and reaction time in a reaction of a precursor PPE with the reactive compound, and so forth.

Particularly in a case in which the presently disclosed (A) polyphenylene ether includes at least one structural unit selected from chemical formulae (1) and (2), the number of structural units selected from the group consisting of chemical formulae (1) and (2) that are included in (A) the polyphenylene ether chain is preferably within a range of 0.1 units to 10 units per 100 monomer units forming the polyphenylene ether. Inclusion of 0.1 or more structural units selected from the group consisting of chemical formulae (1) and (2) per 100 units can improve heat aging resistance properties, whereas inclusion of 10 or fewer structural units selected from the group consisting of chemical formulae (1) and (2) per 100 units can improve heat aging resistance without deterioration of mechanical properties. The number of structural units selected from the group consisting of chemical formulae (1) and (2) per 100 units is more preferably within a range of 0.1 units to 3.0 units, and even more preferably within a range of 0.1 units to 1.0 units.

Particularly in a case in which the presently disclosed (A) polyphenylene ether includes a structural unit represented by chemical formula (3), the number of structural units represented by formula (3) that are included per 100 monomer units forming the polyphenylene ether is preferably within a range of 0.01 units to 10 units, more preferably within a range of 0.01 units to 5.0 units, even more preferably within a range of 0.03 units to 3.0 units, and particularly preferably within a range of 0.03 units to 1.0 units. Inclusion of 0.01 or more structural units represented by formula (3) can improve heat aging resistance properties, whereas inclusion of 10 or fewer structural units represented by formula (3) can improve heat aging resistance without deterioration of mechanical properties, and inclusion of 5 or fewer structural units represented by formula (3), in particular, further improves the balance of fluidity and heat aging resistance.

In the present embodiment, inclusion of structural units represented by all of formulae (1), (2), and (3) is preferable for both inhibiting crosslinking of the polyphenylene ether and achieving good long-term mechanical properties.

The presently disclosed (A) polyphenylene ether is a polyphenylene ether that includes at least one structural unit selected from chemical formulae (1), (2), and (3) as described above, and is preferably a polyphenylene ether for which $X_1$ is a group selected from the group consisting of

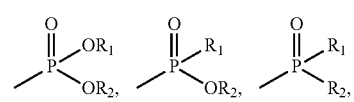

in chemical formulae (1) and (2).

Moreover specifically, in the present embodiment, it is preferable that at least one structure selected from chemical formulae (6) and (7) is included for achieving both heat aging resistance properties and surface appearance of a shaped article.

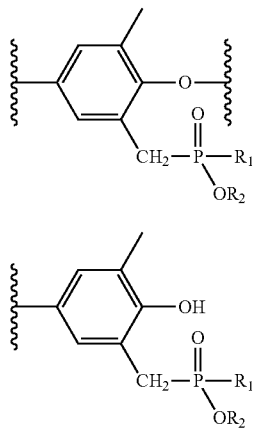

(6)

(7)

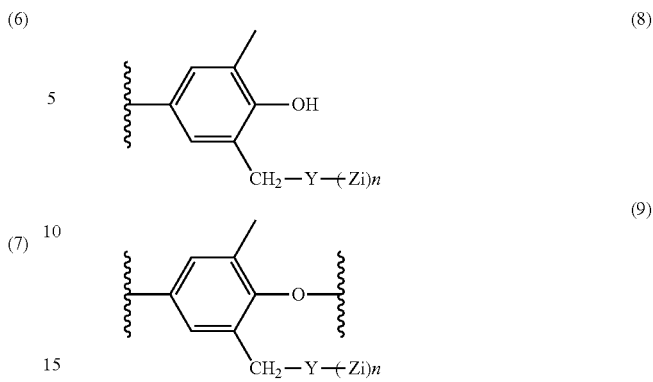

(8)

(9)

Note that $R_1$ and $R_2$ in chemical formulae (6) and (7) may be the same as $X_1$ in chemical formulae (1) and (2).

<Method of Synthesis of (A) Polyphenylene Ether>

It is preferable that (A) the polyphenylene ether according to the present embodiment is obtained by reacting a subsequently described reactive compound with a precursor of (A) the polyphenylene ether (hereinafter, also referred to as a "precursor polyphenylene ether") that has a substituent on the methylene group in chemical formula (1) and chemical formula (2) for (A) the polyphenylene ether that is different to $X_1$ in formula (1) and formula (2). This is because (A) the polyphenylene ether according to the present embodiment can be more efficiently obtained through synthesis from the precursor polyphenylene ether than through synthesis from a polyphenylene ether for which the $X_1$ part in chemical formulae (1) and (2) for (A) the polyphenylene ether is hydrogen (hereinafter, also referred to as "unsubstituted polyphenylene ether").

It is preferable that a structural unit of chemical formula (3) is obtained in (A) the polyphenylene ether according to the present embodiment by reacting a precursor polyphenylene ether and a subsequently described reactive compound through heating in the same way as described above. It is also preferable that the structural unit of chemical formula (3) is obtained by reacting the reactive compound with a terminal hydroxy group of the polyphenylene ether.

The precursor polyphenylene ether is preferably a polyphenylene ether in which terminal group and side chain group-containing structural units represented by chemical formulae (8) and (9), shown below, are included in an unsubstituted polyphenylene ether chain. Through inclusion of structural units of the following chemical formulae (8) and (9) in the precursor PPE, (A) the polyphenylene ether can be obtained with sufficient efficiency (specifically, in production of (A) the PPE, (A) the PPE can be obtained via the precursor PPE with sufficient efficiency because the $CH_2$—Y part of the structures of chemical formulae (8) and (9) is selectively cleaved and undergoes a substitution reaction with the subsequently described reactive compound). Moreover, since the precursor PPE can be easily synthesized from an unsubstituted PPE, (A) the PPE can be efficiently synthesized via the precursor PPE. Furthermore, the total content of the aforementioned structural units in the polyphenylene ether chain of the precursor PPE is preferably 0.1 units to 10 units per 100 units of the polyphenylene ether chain.

(In chemical formulae (8) and (9), Y represents a N atom or an O atom, and Zi represents a saturated or unsaturated hydrocarbon group that has a carbon number of 1 to 20 and that is cyclic or chain-shaped (i.e., linear or branched). Furthermore, in chemical formulae (8) and (9), i and n are each an integer of 1 or 2, where Z1 and Z2 may be the same or different and may form a cyclic structure in conjunction with Y bonded thereto through bonding therebetween.)

No specific limitations are placed on the method used to produce the precursor polyphenylene ether including structural units of chemical formulae (8) and (9). Examples of methods that can be used include a method in which (a1) a compound such as an amine, an alcohol, or morpholine is added and caused to react in a polymerization reaction of a polyphenylene ether and a method in which an unsubstituted polyphenylene ether that has been polymerized is, for example, stirred at 20° C. to 60° C., and preferably at 40° C., in a solvent such as toluene in which the PPE is soluble, and the aforementioned (a1) compound is added thereto and is caused to react.

Although no specific limitations are placed on the (a1) compound, specific examples thereof include primary amines such as n-propylamine, isopropylamine, n-butylamine, isobutylamine, sec-butylamine, n-hexylamine, n-octylamine, 2-ethylhexylamine, cyclohexylamine, laurylamine, and benzylamine; secondary amines such as diethylamine, di-n-propylamine, di-n-butylamine, diisobutylamine, di-n-octylamine, piperidine, and 2-pipecoline; alcohols such as methanol, ethanol, n-propanol, isopropanol, n-butanol, isobutanol, and sec-butanol; and morpholine.

No specific limitations are placed on the method used to obtain (A) the polyphenylene ether. Examples of methods that can be used include a method in which a subsequently described reactive compound is added in polymerization of a polyphenylene ether and polymerization of (A) the polyphenylene ether is carried out, a method in which a small amount of a monomer substituted with a subsequently described reactive compound is added in polymerization of a polyphenylene ether and polymerization of (A) the polyphenylene ether is carried out, and a method in which an unsubstituted polyphenylene ether and a reactive compound are melt-kneaded and caused to react. More specific examples include a method in which the (a1) compound is added and caused to react in polymerization of PPE, and a subsequently described reactive compound is then caused to react, a method in which a small amount of 2,6-dimethylphenol that has been substituted with the (a1) compound is added and caused to react in polymerization of PPE, and a method in which a precursor PPE is obtained and the precursor PPE and a reactive compound are subsequently melt-kneaded and caused to react (i.e., the precursor PPE and the reactive compound are, for example, melt-kneaded in production of a resin composition by melt-kneading using the precursor PPE).

<<Reactive Compound>>

Examples of reactive compounds that can be used to obtain (A) the polyphenylene ether according to the present embodiment include, but are not limited to, phosphonic acids, phosphonic acid esters, phosphinic acids, phosphinic acid esters, monocarboxylic acids, sulfonic acids, sulfinic acids, and carbonates.

Examples of phosphonic acids that can be used include phosphonic acid (phosphorus acid), methylphosphonic acid, ethylphosphonic acid, vinylphosphonic acid, decylphosphonic acid, phenylphosphonic acid, benzylphosphonic acid, aminomethylphosphonic acid, methylenediphosphonic acid, 1-hydroxyethane-1,1-diphosphonic acid, 4-methoxyphenylphosphonic acid, and propylphosphonic anhydride.

Examples of phosphonic acid esters that can be used include dimethyl phosphonate, diethyl phosphonate, bis(2-ethylhexyl) phosphonate, dioctyl phosphonate, dilauryl phosphonate, dioleyl phosphonate, diphenyl phosphonate, dibenzyl phosphonate, dimethyl methylphosphonate, diphenyl methylphosphonate, dioctyl methylphosphonate, diethyl ethylphosphonate, dioctyl ethylphosphonate, diethyl benzylphosphonate, dimethyl phenylphosphonate, diethyl phenylphosphonate, dipropyl phenylphosphonate, dioctyl phenylphosphonate, diethyl (methoxymethyl)phosphonate, dioctyl (methoxymethyl)phosphonate, diethyl vinylphosphonate, diethyl hydroxymethylphosphonate, dimethyl (2-hydroxyethyl)phosphonate, dioctyl (methoxymethyl)phosphonate, diethyl p-methylbenzylphosphonate, dioctyl p-methylbenzylphosphonate, diethylphosphonoacetic acid, ethyl diethylphosphonoacetate, tert-butyl diethylphosphonoacetate, dioctyl di ethylphosphonate, diethyl (4-chlorobenzyl)phosphonate, dioctyl (4-chlorobenzyl)phosphonate, diethyl cyanophosphonate, diethyl cyanomethylphosphonate, dioctyl cyanophosphonate, diethyl 3,5-di-tert-butyl-4-hydroxybenzylphosphonate, dioctyl 3,5-di-tert-butyl-4-hydroxybenzylphosphonate, and diethyl (methylthiomethyl)phosphonate.

Examples of phosphinic acids that can be used include dimethylphosphinic acid, ethylmethylphosphinic acid, diethylphosphinic acid, methyl-n-propylphosphinic acid, diphenylphosphinic acid, dioleylphosphinic acid, 9,10-dihydro-9-oxa-10-phosphaphenanthrene-10-oxide, and derivatives thereof.

Examples of phosphinic acid esters that can be used include methyl dimethylphosphinate, ethyl dimethylphosphinate, n-butyl dimethylphosphinate, cyclohexyl dimethylphosphinate, vinyl dimethylphosphinate, phenyl dimethylphosphinate, methyl ethylmethylphosphinate, ethyl ethylmethylphosphinate, n-butyl ethylmethylphosphinate, cyclohexyl ethylmethylphosphinate, vinyl ethylmethylphosphinate, phenyl ethylmethylphosphinate, methyl diethylphosphinate, ethyl diethylphosphinate, n-butyl diethylphosphinate, cyclohexyl diethylphosphinate, vinyl diethylphosphinate, phenyl diethylphosphinate, methyl diphenylphosphinate, ethyl diphenylphosphinate, n-butyl diphenylphosphinate, cyclohexyl diphenylphosphinate, vinyl diphenylphosphinate, phenyl diphenylphosphinate, methyl methyl-n-propylphosphinate, ethyl methyl-n-propylphosphinate, n-butyl methyl-n-propylphosphinate, cyclohexyl methyl-n-propylphosphinate, vinyl methyl-n-propylphosphinate, phenyl methyl-n-propylphosphinate, methyl dioleylphosphinate, ethyl dioleylphosphinate, n-butyl dioleylphosphinate, cyclohexyl dioleylphosphinate, vinyl dioleylphosphinate, and phenyl dioleylphosphinate.

Examples of monocarboxylic acids that can be used include monocarboxylic acids such as formic acid, acetic acid, propionic acid, butyric acid, hexanoic acid, heptanoic acid, octanoic acid, nonanoic acid, decanoic acid, dodecanoic acid, tetradecanoic acid, octadecanoic acid, docosanoic acid, hexacosanoic acid, octadecenoic acid, docosenoic acid, and isooctadecanoic acid, alicyclic monocarboxylic acids such as cyclohexane carboxylic acid, aromatic monocarboxylic acids such as benzoic acid and methylbenzoic acid, hydroxy aliphatic monocarboxylic acids such as hydroxypropionic acid, hydroxyoctadecanoic acid, and hydroxyoctadecenoic acid, and sulfur-containing aliphatic monocarboxylic acids such as alkyl thiopropionic acid.

Examples of sulfonic acids that can be used include alkyl sulfonic acids, benzenesulfonic acid, naphthalenesulfonic acid, anthraquinonesulfonic acid, camphorsulfonic acid, and derivatives of the preceding sulfonic acids. These sulfonic acids may be monosulfonic acids, disulfonic acids, or trisulfonic acids. Examples of derivatives of benzenesulfonic acid that can be used include phenolsulfonic acid, styrenesulfonic acid, toluenesulfonic acid, and dodecylbenzenesulfonic acid. Examples of derivatives of naphthalenesulfonic acid that can be used include 1-naphthalenesulfonic acid, 2-naphthalenesulfonic acid, 1,3-naphthalenedisulfonic acid, 1,3,6-naphthalenetrisulfonic acid, and 6-ethyl-1-naphthalenesulfonic acid. Examples of derivatives of anthraquinonesulfonic acid that can be used include anthraquinone-1-sulfonic acid, anthraquinone-2-sulfonic acid, anthraquinone-2,6-disulfonic acid, and 2-methylanthraquinone-6-sulfonic acid.

Examples of sulfinic acids that can be used include alkane sulfinic acids such as ethanesulfinic acid, propanesulfinic acid, hexanesulfinic acid, octanesulfinic acid, decanesulfinic acid, and dodecanesulfinic acid; alicyclic sulfinic acids such as cyclohexanesulfinic acid and cyclooctanesulfinic acid; and aromatic sulfinic acids such as benzenesulfinic acid, o-toluenesulfinic acid, p-toluenesulfinic acid, ethylbenzenesulfinic acid, decylbenzenesulfinic acid, dodecylbenzenesulfinic acid, chlorobenzenesulfinic acid, and naphthalenesulfinic acid.

Examples of carbonates that can be used include dimethyl carbonate, diethyl carbonate, diisopropyl carbonate, dibutyl carbonate, dihexyl carbonate, dioctyl carbonate, diphenyl carbonate, methyl ethyl carbonate, methyl phenyl carbonate, ethyl phenyl carbonate, butyl phenyl carbonate, and ditolyl carbonate.

From a viewpoint of reactivity, the reactive compound is preferably a phosphoric compound. Specifically, the reactive compound is preferably diphenyl phosphonate, dioleyl phosphonate, dioctyl phosphonate, diphenylphosphinic acid, dioleylphosphinic acid, or the like, and is more preferably 9,10-dihydro-9-oxa-10-phosphaphenanthrene-10-oxide.

Through use of (A) a polyphenylene ether obtained using 9,10-dihydro-9-oxa-10-phosphaphenanthrene-10-oxide, it is possible to improve heat aging resistance properties and also further improve fluidity during melt-kneading of a resin composition in which the PPE is used.

[Resin Composition]

Next, a presently disclosed resin composition is described.

The presently disclosed resin composition preferably contains (B) an antioxidant in (A) the polyphenylene ether described above.

<(A) Polyphenylene Ether>

In the present embodiment, (A) the polyphenylene ether has the structure described above and, from a viewpoint of increasing the effects of this disclosure, the resin composition containing (A) the polyphenylene ether preferably contains (A) the polyphenylene ether in a proportion of suitably 10 mass % or more, and more suitably 20 mass % or more, and suitably 90 mass % or less, and more suitably 80 mass % or less.

In the present embodiment, the resin composition containing (A) the polyphenylene ether more preferably contains (A) the polyphenylene ether in a proportion of 30 mass % to 90 mass %.

In this configuration, the resin composition can be provided with mechanical strength as a result of content of the (A) component being 30 mass % or more, and fluidity during melt-kneading can be ensured as a result of content of the (A) component being 90 mass % or less.

<(B) Antioxidant>

Both primary antioxidants that act as radical chain inhibitors and secondary antioxidants that have an effect of breaking down peroxides can be used as antioxidants in this disclosure. In other words, through the use of an antioxidant, radicals that may arise at terminal methyl groups or side chain methyl groups when the polyphenylene ether is exposed to high temperature for a long time can be captured (primary antioxidant) or peroxides that may arise at terminal methyl groups or side chain methyl groups due to the aforementioned radicals can be broken down (secondary antioxidant). Consequently, oxidative crosslinking of the polyphenylene ether can be prevented.

Mainly hindered phenol antioxidants can be used as primary antioxidants and specific examples thereof include 2,6-di-t-butyl-4-methylphenol, pentaerythritol tetrakis[3-(3,5-di-t-butyl-4-hydroxyphenyl)propionate], n-octadecyl-3-(3,5-di-t-butyl-4-hydroxyphenyl)propionate, 2,2'-methylen-ebis(4-methyl-6-t-butylphenol), 2,6-di-t-butyl-4-(4,6-bis (octylthio)-1,3,5-triazin-2-ylamino)phenol, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 4,4'-butylidenebis(3-methyl-6-t-butylphenol), 4,4'-thiobis(3-methyl-6-t-butylphenol), alkylated bisphenol, tetrakis[methyl ene-3-(3,5-di-t-butyl-4-hydroxyphenyl)propionate]methane, and 3,9-bis[2-{3-(3-t-butyl-4-hydroxy-5-methylphenyl)-propionyl oxy}-1,1-dimet hylethyl]-2,4,8,10-tetraoxyspiro[5,5]undecane.

Mainly phosphoric antioxidants and sulfuric antioxidants can be used as secondary antioxidants. Specific examples of phosphoric antioxidants that can be used include trisnonylphenyl phosphite, triphenyl phosphite, tris(2,4-di-t-butylphenyl) phosphite, bis(2,4-di-t-butylphenyl)pentaerythritol-diphosphite, bis(2,6-di-t-butyl-4-methylphenyl) pentaerythritol-diphosphite, and 3,9-bis(2,6-di-tert-butyl-4-methylphenoxy)-2,4,8,10-tetraoxa-3,9-diphosphasp iro[5,5] undecane. Specific examples of sulfuric antioxidants that can be used include dilauryl 3,3'-thiodipropionate, dimyristyl 3,3'-thiodipropionate, distearyl 3,3'-thiodipropionate, pentaerythrityl tetrakis(3-laurylthiopropionate), ditridecyl 3,3'-thiodipropionate, 2-mercaptobenzimidazole, and 2,6-di-tert-butyl-4-(4,6-bis(octylthio)-1,3,5-triazin-2-ylamino)phenol.

Furthermore, examples of other antioxidants that can be used together with the antioxidants described above include metal oxides and sulfides such as zinc oxide, magnesium oxide, and zinc sulfide.

Of these antioxidants, secondary antioxidants are effective for improving long-term properties of the polyphenylene ether resin, and among secondary antioxidants, phosphoric antioxidants are preferable.

The total additive amount of (B) antioxidant relative to (A) the polyphenylene ether is preferably 0.1 parts by mass to 5.0 parts by mass, more preferably 0.1 parts by mass to 3.0 parts by mass, and even more preferably 0.1 parts by mass to 1.5 parts by mass. When the total additive amount of (B) antioxidant is within any of the ranges set forth above, a flame-retardant resin composition having excellent initial and post-long-term heat aging flame retardance, and excellent mechanical strength can be obtained.

<(C) Styrenic Resin>

The resin composition according the present embodiment may contain (C) a styrenic resin with the aim of adjusting heat resistance or shaping fluidity. Commonly known styrenic resins can be used as (C) the styrenic resin without any specific limitations. For example, a homopolymer of a styrenic compound or a copolymer obtained through polymerization of a styrenic compound and a compound that is copolymerizable with the styrenic compound in the presence or absence of a rubbery polymer may be used.

Examples of the styrenic compound include, but are not specifically limited to, styrene, α-methylstyrene, 2,4-dimethylstyrene, monochlorostyrene, p-methyl styrene, p-tert-butylstyrene, and ethyl styrene. Of these styrenic compounds, styrene is preferable from a viewpoint of practicality of raw material.

Examples of the compound that is copolymerizable with the styrenic compound include methacrylic acid esters such as methyl methacrylate and ethyl methacrylate; unsaturated nitrile compounds such as acrylonitrile and methacrylonitrile; and acid anhydrides such as maleic anhydride.

Polystyrene is preferable as (C) the styrenic resin in the present embodiment from a viewpoint of miscibility with the polyphenylene ether.

Among polystyrenes, rubber-reinforced polystyrene is preferable from a viewpoint of enhancing impact resistance, whereas general purpose polystyrene is preferable from a viewpoint of enhancing external appearance of a shaped article.

The rubber-reinforced polystyrene may be a polymer that is obtained through polymerization of a styrenic compound and a compound that is copolymerizable with the styrenic compound in the presence of a rubbery polymer.

The content of the compound that is copolymerizable with the styrenic compound in the polymer is preferably 20 mass % or less, and more preferably 15 mass % or less relative to 100 mass %, in total, of the styrenic compound and the compound that is copolymerizable with the styrenic compound. Examples of rubbery polymers that may be used include, but are not limited to, a conjugated diene rubber, a copolymer of a conjugated diene and an aromatic vinyl compound, and an ethylene-propylene copolymer rubber, and more specifically include polybutadiene, a styrene-butadiene random copolymer, a styrene-butadiene block copolymer, and a polymer obtained through partial or almost complete hydrogenation of any of the preceding examples.

A specific example of rubber-reinforced polystyrene is high impact polystyrene (HIPS). The rubbery polymer contained in this HIPS may suitably be a styrene-butadiene block copolymer.

The rubber particles of the rubbery polymer contained in the HIPS may, for example, have a salami structure (multicell structure) or polystyrene core (single cell structure) form. The term "salami structure" refers to a structure in which rubber particles dispersed in a polystyrene matrix have a cross-section similar to salami sausage. In other words, this is a structure in which polystyrene particles are contained in a honeycomb-like form within a rubber particle phase having a thin outer layer. The term "polystyrene core" refers to a form in which rubber particles dispersed in a polystyrene matrix have a single cell structure (core-shell structure).

The rubber-reinforced polystyrene can be produced by bulk polymerization or bulk suspension polymerization, and the form of the rubber particles can be controlled by controlling the stirring state during a polymerization step, the mixing state in production of rubber particles, or the like.

The content of (C) the styrenic resin that may be used in the present embodiment is preferably within a range of 0 mass % to 70 mass %, more preferably within a range of 5 mass % to 50 mass %, and even more preferably within a range of 10 mass % to 40 mass % among 100 mass % of the resin composition. With regards to the content of (C) the styrenic resin, it is preferable that (C) the styrenic resin is included from a viewpoint of enhancing shaping fluidity of the resin composition, and it is preferable that (C) the styrenic resin is included in a proportion of 70 mass % or less from a viewpoint of sufficiently maintaining heat resistance.

<(D) Elastomer Component>

The resin composition according to the present embodiment may further contain (D) an elastomer component with the aim of improving impact resi stance.

Commonly known elastomer components can be used as (D) the elastomer component. From a viewpoint of miscibility with the (A) component and heat resistance, it is preferable that a block copolymer having a styrene block and a hydrogenated conjugated diene compound block (hereinafter, also referred to as a "styrene block-hydrogenated conjugated diene compound block copolymer") is included.

The conjugated diene compound block is preferably hydrogenated with a percentage hydrogenation of 50% or more, more preferably 80% or more, and even more preferably 95% or more from a viewpoint of thermal stability.

Examples of the conjugated diene compound block include, but are not limited to, polybutadiene, polyi soprene, poly(ethylene-butylene), poly(ethylene-propylene), and vinyl-polyisoprene. One type of conjugated diene compound block may be used individually, or two or more types of conjugated diene compound blocks may be used in combination.

The arrangement of repeating units composing the block copolymer may be a linear type or a radial type. Moreover, polystyrene blocks and rubber intermediate blocks may form a two, three, or four block structure. Among such block copolymers, a triblock linear-type block copolymer formed by a polystyrene-poly(ethylene-butylene)-polystyrene structure is preferable from a viewpoint of sufficiently exhibiting the effects that are desired in the present embodiment. Note that the conjugated diene compound blocks may include butadiene units within a range not exceeding 30 mass %.

The styrene block-hydrogenated conjugated diene compound block copolymer that may be used in the present embodiment preferably has a weight average molecular weight Mw within a range of 50,000 to 300,000, more preferably within a range of 70,000 to 280,000, and even more preferably within a range of 100,000 to 250,000 from a viewpoint of enhancing impact resistance. The weight average molecular weight Mw of the styrene block-hydrogenated conjugated diene compound block copolymer is preferably 50,000 or more from a viewpoint of imparting sufficient impact resistance and is preferably 300,000 or less from a viewpoint of shaped product fluidity, retention of external appearance, and miscibility.

The styrene block-hydrogenated conjugated diene compound block copolymer that may be used in the present embodiment preferably has a bound styrene content within a range of 20 mass % to 80 mass %, more preferably within a range of 30 mass % to 60 mass %, and even more preferably within a range of 30 mass % to 45 mass %. The bound styrene content of the styrene block-hydrogenated conjugated diene compound block copolymer is preferably 20 mass % or more from a viewpoint of miscibility and is preferably 80 mass % or less from a viewpoint of imparting impact resistance.

The content of (D) the elastomer component that may be used in the resin composition according to the present embodiment is preferably within a range of 1 mass % to 15 mass %, more preferably within a range of 3 mass % to 12 mass %, and even more preferably within a range of 5 mass % to 12 mass % in 100 mass % of the resin composition. The content of (D) the elastomer component is preferably 1 mass % or more from a viewpoint of imparting impact resistance required for the applications described herein, and is preferably 15 mass % or less from a viewpoint of heat resistance and rigidity retention.

<Other Components>

The resin composition according to the present embodiment may further contain antioxidants other than (B), ultraviolet absorbers, antistatic agents, lubricants, release agents, and the like to the extent that heat resistance and mechanical properties of the resin composition, surface appearance and heat aging resistance properties of a shaped article, and so forth are not significantly reduced.

In terms of content of these other components in the resin composition according to the present embodiment, each component may be contained within a range of 0.001 mass % to 3 mass % among 100 mass % of the resin composition, is preferably contained within a range of 0.01 mass % to 0.5 mass %, and is more preferably contained within a range of 0.2 mass % to 0.5 mass %. The content of other antioxidants and the like is preferably 0.001 mass % or more from a viewpoint of exhibiting a sufficient additive effect, and is preferably 3 mass % or less from a viewpoint of adequate shaped article external appearance and retention of physical properties.

The resin composition used in the present embodiment may further contain an inorganic filler as a reinforcement agent with the aim of improving mechanical strength. The inorganic filler used as a reinforcement agent is a material that is commonly used to reinforce thermoplastic resins and examples thereof include glass fiber, carbon fiber, glass flake, talc, chlorite, and mica.

The content of inorganic filler used in the present embodiment among 100 mass % of the resin composition is preferably 50 mass % or less, more preferably 0.5 mass % to 40 mass %, and even more preferably 1 mass % to 30 mass %. Inclusion of an inorganic filler is preferable from a viewpoint of improving mechanical strength of the resin composition, whereas an inorganic filler content of 50 mass % or less is preferable from a viewpoint of adequate shaped article external appearance and retention of shaping fluidity.

[Production Method of Resin Composition]

The resin composition according to the present embodiment can be produced by melt-kneading the (A) component and the (B) component described above, and other optional raw materials under melt-kneading conditions that are adjusted as appropriate. Although no specific limitations are placed on the melt-kneading conditions of the (A) component, the (B) component, and the other components in production of the resin composition, it is appropriate to use a twin screw extruder having a screw diameter of 25 mm to 90 mm from a viewpoint of stably obtaining a large quantity of a resin composition that can sufficiently exhibit the effects desired in the present embodiment. As one example, in a case in which a TEM-58SS twin screw extruder (produced by Toshiba Machine Co., Ltd.; number of barrels: 13; screw diameter: 58 mm; L/D=53; screw pattern including 2 kneading discs L, 14 kneading discs R, and 2 kneading discs N) is used, melt-kneading may be carried out under conditions of a cylinder temperature of 270° C. to 330° C., a screw rotation speed of 150 rpm to 700 rpm, an extrusion rate of 150 kg/h to 600 kg/h, and a vent degree of vacuum of 11.0 kPa to 1.0 kPa.

The temperature of extruded resin is preferably within a range of 250° C. to 380° C. The extruded resin temperature is more preferably within a range of 270° C. to 360° C., and even more preferably within a range of 300° C. to 350° C. An extruded resin temperature of 250° C. or higher is preferable from a viewpoint of obtaining sufficient reactivity and extrudability, whereas an extruded resin temperature of 380° C. or lower is preferable from a viewpoint of sufficient mechanical property retention and extrudability.

In a situation in which the resin composition according to the present embodiment is produced using a large-scale (screw diameter: 40 mm to 90 mm) twin screw extruder, gel and carbides that may be generated from the (A) component may become mixed into extruded resin pellets during extrusion, and this may cause deterioration of surface appearance and brightness of a shaped article. Therefore, it is preferable that the (A) component is fed from a furthest upstream raw material feeding inlet (top feed) and that the oxygen concentration inside a chute of the furthest upstream raw material feeding inlet is set as 15 vol. % or less, more preferably 8 vol. % or less, and even more preferably 1 vol. % or less.

Note that adjustment of the oxygen concentration can be performed by, after sufficiently purging the inside of a raw material storage hopper with nitrogen and tightly sealing a feed line from the raw material storage hopper to the raw material feeding inlet of the extruder such that air does not enter or exit the feed line, adjusting the nitrogen feed rate and the aperture of a gas vent.

[Shaped Article]

A shaped article formed from the resin composition according to the present embodiment can be obtained through shaping of the resin composition set forth above.

Examples of suitable methods of shaping the resin composition include, but are not limited to, injection molding extrusion molding, vacuum forming, and pressure forming. In particular, injection molding is more suitable from a viewpoint of shaping external appearance and brightness.

With regards to the shaping temperature in shaping of the resin composition, shaping is preferably performed with a maximum barrel temperature setting within a range of 250° C. to 350° C., more preferably within a range of 270° C. to 340° C., and even more preferably within a range of 280° C. to 330° C. A shaping temperature of 250° C. or higher is preferable from a viewpoint of sufficient shaping processability, whereas a shaping temperature of 350° C. or lower is preferable from a viewpoint of inhibiting resin thermal degradation.

The mold temperature in shaping of the resin composition is preferably within a range of 40° C. to 170° C., more preferably within a range of 80° C. to 150° C., and even more preferably within a range of 80° C. to 130° C. A mold temperature of 40° C. or higher is preferable from a viewpoint of retaining adequate shaped article external appearance, whereas a mold temperature of 170° C. or lower is preferable from a viewpoint of shaping stability.

A shaped article according to the present embodiment can suitably be used in various applications for automobiles, home appliances, office machines, industrial goods, and so forth due to its excellent heat aging resistance properties and, in particular, is preferable as an automotive component that is required to have high heat aging resistance.

EXAMPLES

The following provides a more specific description of the present embodiment through examples and comparative examples. However, the present embodiment is not limited to only these examples. Measurement methods of physical properties and raw materials used in the examples and comparative examples were as follows.

[Measurement Methods of Physical Properties]

1. Deflection Temperature Under Load (DTUL)

Pellets of an obtained resin composition were dried for 3 hours at 90° C. in a hot-air dryer. An injection molding machine (IS-80EPN produced by Toshiba Machine Co., Ltd.) equipped with an ISO physical property specimen mold was used to mold the dried resin composition with settings of a cylinder temperature of 330° C., a mold temperature of 120° C., an injection pressure of 50 MPa (gauge pressure), an injection speed of 200 mm/s, and an injection time/cooling time of 20 s/20 s in order to form a dumbbell molded piece as an ISO 3167, type A multipurpose specimen. An 80 mm×10 mm×4 mm specimen prepared by cutting the obtained molded piece was used in measurement of deflection temperature under load (DTUL) (° C.) at 1.82 MPa by the flatwise method in accordance with ISO 75.

In terms of evaluation criteria, a higher value for the DTUL was judged to be more beneficial in terms of material design of the present composition.

2. Shaping Fluidity (MFR)

Pellets of an obtained resin composition were dried for 3 hours at 120° C. in a hot-air dryer. After this drying, the melt flow rate (MFR) (g/10 min) of the resin composition pellets was measured with a cylinder temperature setting of 280° C. and a load of 10 kg using a melt indexer (P-111 produced by Toyo Seiki Seisaku-Sho, Ltd.).

In terms of evaluation criteria, a higher value for the MFR was judged to be more beneficial in terms of material design of the present composition.

3. Shaped Article External Appearance (Visual Evaluation of Molded Piece)

In the molding described in section 1, a dumbbell molded piece was molded by performing a short shot without complete filling (state in which molding is performed with injection into an ISO dumbbell mold such that a gap of 5 mm or less is formed at the dead end). A grip section at the dead end where filling was not complete was visually observed and the state of the molded piece surface was judged as "good" or "poor". A judgment of "poor" was made in a case in which there was a defect such as silvering, surface roughness due to fine gas escape marks, or cloudiness, and a judgment of "good" was made in a case in which such defects were not observed.

4. Heat Aging Resistance Properties (Tensile Strength after Aging at 135° C.)

Dumbbell molded pieces obtained as described in section 1 were aged in a hot-air oven with a temperature setting of 135° C. for 500 hours, 1,000 hours, and 1,500 hours, respectively. The dumbbell molded pieces were then left for 8 hours at 23° C. The tensile strength of five dumbbell molded pieces was measured at 23° C. in accordance with ISO 527 for each of these aging times, and an average value of the measurements was taken to be the tensile strength (MPa). In terms of evaluation criteria, the tensile strength maintenance rate was calculated based on the following equation (1) and a tensile strength maintenance rate of 75% or more was judged to indicate excellent heat aging resistance properties.

Tensile strength maintenance rate (%)=Tensile strength after 1,500 hours÷Initial tensile strength×100 (1)

[Raw Materials]
<Polyphenylene Ether>
(Precursor Polyphenylene Ether: PPE-1)

A jacketed reactor having a capacity of 10 L and equipped with a stirrer, a thermometer, a condenser, and an oxygen supply tube that extended to the bottom of the reactor was charged with 2 g of cupric bromide that was then dissolved in 35 g of di-n-butylamine and 800 g of toluene. A solution of 200 g of 2,6-dimethylphenol dissolved in 500 g of toluene was added to the resultant catalyst solution. The mixed liquid of these solutions was caused to undergo polymerization for 3 hours at 40° C. in the reactor while oxygen was supplied thereto. After the reaction had been terminated, the reaction liquid was brought into contact with water and the catalyst was removed from the reaction liquid to obtain a polyphenylene ether reaction liquid. The polyphenylene ether reaction liquid was continuously brought into contact with methanol under stirring while perform solidification to obtain a polyphenylene ether slurry. Wet pulverization of the slurry was carried out using a 1 mm lattice slit in a Disintegrator (product name) produced by Komatsu Zenoah Co. and solid-liquid separation of the pulverized slurry was carried out while continuously supplying the pulverized slurry into a Young filter-type vacuum filter. Rinse washing was performed with methanol in an amount equivalent to three times the weight of polyphenylene ether after drying on the Young filter-type vacuum filter. After this washing, the resultant polyphenylene ether particles were dried. The polyphenylene ether particles in the slurry after wet pulverization had a content of particles larger than 1,700 μm of 0 weight % and a weight average particle diameter of 220 μm.

Poly(2,6-dimethyl-1,4-phenylene) ether (PPE-1) obtained as a precursor polyphenylene ether by the production method described above had a reduced viscosity of 0.38 dL/g, a number average molecular weight of 15,300, a number of terminal OH groups per 100 monomer units forming the precursor polyphenylene ether of 0.72, and a number of di-n-butylaminomethyl groups per 100 monomer units forming the precursor polyphenylene ether of 0.43.

The reduced viscosity was measured by an Ubbelohde-type viscometer at 30° C. using a 0.5 g/dL chloroform solution.

(Precursor Polyphenylene Ether: PPE-2)

A jacketed reactor having a capacity of 10 L and equipped with a stirrer, a thermometer, a condenser, and an oxygen supply tube that extended to the bottom of the reactor was charged with 2 g of cupric bromide that was then dissolved in 35 g of di-n-butylamine and 800 g of toluene. A solution of 200 g of 2,6-dimethylphenol dissolved in 500 g of toluene was added to the resultant catalyst solution. The mixed liquid of these solutions was caused to undergo polymerization for 1 hour at 40° C. in the reactor while oxygen was supplied thereto. After the reaction had been terminated, the reaction liquid was brought into contact with water and the catalyst was removed from the reaction liquid to obtain a polyphenylene ether reaction liquid. The polyphenylene ether reaction liquid was continuously brought into contact with methanol under stirring while performing solidification to obtain a polyphenylene ether slurry. Wet pulverization of the slurry was carried out using a 1 mm lattice slit in a Disintegrator (product name) produced by Komatsu Zenoah Co. and solid-liquid separation of the pulverized slurry was carried out while continuously supplying the pulverized slurry into a Young filter-type vacuum filter. Rinse washing was performed with methanol in an amount equivalent to three times the weight of polyphenylene ether after drying on the Young filter-type vacuum filter. After this washing, the resultant polyphenylene ether particles were dried. The polyphenylene ether particles in the slurry after wet pulverization had a content of particles larger than 1,700 μm of 0 weight % and a weight average particle diameter of 220 μm.

Poly(2,6-dimethyl-1,4-phenylene) ether (PPE-2) obtained as a precursor polyphenylene ether by the production method described above had a reduced viscosity of 0.13 dL/g, a number average molecular weight of 3,000, a number of terminal OH groups per 100 monomer units forming the precursor polyphenylene ether of 5.2, and a number of di-n-butylaminomethyl groups per 100 monomer units forming the precursor polyphenylene ether of 0.5.

The reduced viscosity was measured by an Ubbelohde-type viscometer at 30° C. using a 0.5 g/dL chloroform solution.

(Precursor Polyphenylene Ether: PPE-3)

A 40 L jacketed polymerization tank equipped with a sparger for introduction of an oxygen-containing gas at the bottom of the polymerization tank, a stirring turbine impeller, and a baffle, and having a reflux condenser on a vent gas line at the top of the polymerization tank was charged with 4.57 g of cupric oxide, 24.18 g of 47 mass % hydrogen bromide aqueous solution, 11.00 g of di-t-butylethylenediamine, 62.72 g of di-n-butylamine, 149.92 g of butyldimethylamine, 20.65 kg of toluene, and 3.12 kg of 2,6-dimethylphenol while blowing nitrogen gas into the polymerization tank at a flow rate of 0.5 L/min. The contents of the polymerization tank were stirred until a homogeneous solution was obtained and the internal temperature of the polymerization tank was 25° C. Next, the sparger was used to start introducing dry air into the polymerization tank at a rate of 32.8 NL/min and polymerization was initiated. Passing of dry air was continued for 140 minutes and a polymerization mixture was obtained. The internal temperature during polymerization was controlled to 40° C. Passing of dry air was stopped and 10 kg of a 2.5 mass % aqueous solution of a tetrasodium salt of ethylenediaminetetraacetic acid (reagent produced by Dojindo Laboratories) was added to the polymerization mixture. The polymerization mixture was stirred for 150 minutes at 70° C. and was then left at rest for 20 minutes. Thereafter, the organic phase and the aqueous phase were separated by liquid-liquid separation.

The obtained organic phase was continuously brought into contact with methanol under stirring while performing solidification to obtain a polyphenylene ether slurry. Wet pulverization of the slurry was carried out using a 1 mm lattice slit in a Disintegrator (product name) produced by Komatsu Zenoah Co. and solid-liquid separation of the pulverized slurry was carried out while continuously supplying the pulverized slurry into a Young filter-type vacuum filter. Rinse washing was performed with methanol in an amount equivalent to three times the weight of polyphenylene ether after drying on the Young filter-type vacuum filter. After this washing, the resultant polyphenylene ether particles were dried. The polyphenylene ether particles in the slurry after wet pulverization had a content of particles larger than 1,700 of 0 weight % and a weight average particle diameter of 220 μm.

Poly(2,6-dimethyl-1,4-phenylene) ether (PPE-1) obtained as a precursor polyphenylene ether by the production method described above had a reduced viscosity of 0.38 dL/g, a number average molecular weight of 15,300, a number of terminal OH groups per 100 monomer units forming the precursor polyphenylene ether of 0.72, and a number of N,N-dibutylaminomethyl groups per 100 monomer units forming the polyphenylene ether of 0.43.

The reduced viscosity was measured by an Ubbelohde-type viscometer at 30° C. using a 0.5 g/dL chloroform solution.

(A-1)

A tumbler mixer was used to mix 100 parts by mass of PPE-1 and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A) a polyphenylene ether component (A-2). Thereafter, vacuum drying was carried out for 4 hours at 60° C. to obtain a powder of (A) the polyphenylene ether (A-2).

It was possible to identify the obtained (A) polyphenylene ether (A-2) by $^{31}$P-NMR (single plus method) and $^1$H-NMR. The added amount of reactive compound at methyl groups was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of chemical formulae (10) and (11), shown below, that were included per 100 monomer units in the polyphenylene ether chain was 0.25.

Moreover, the added amount of reactive compound at terminal hydroxy groups could be determined by equation (2), shown below, using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (12), shown below, that were included per 100 monomer units forming the polyphenylene ether was 0.03. Moreover, it was confirmed that a new doublet peak did not arise at 3.5 ppm to 5.5 ppm in $^1$H-NMR.

Number of additions of reactive compound per 100 monomer units forming polyphenylene ether=
(Number of terminal OH groups per 100 monomer units forming precursor polyphenylene ether)×{[A]/([A]+[B])} (2)

The ratio of chemical formula (10) relative to chemical formula (11) was determined to be 27 mol % by calculating the ratio of an integrated value for a peak at 34 ppm to 36 ppm in $^{31}$P-NMR that originates from chemical formula (10) relative to an integrated value for a peak at 38 ppm to 42 ppm in $^{31}$P-NMR that originates from chemical formula (11).

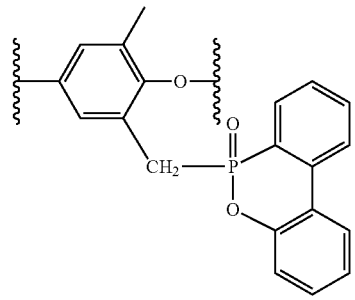

(10)

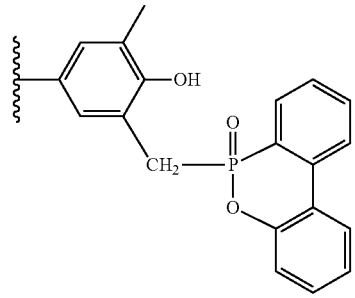

(11)

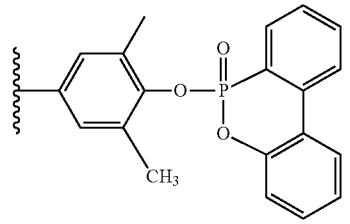

(12)

$^{31}$P-NMR measurement conditions
Device: JEOL RESONANCE ECS400
Observed nucleus: $^{31}$P
Observation frequency: 161.8 MHz
Pulse width: 45°
Wait time: 5 s
Cumulative number: 10,000
Solvent: CDCl$_3$
Sample concentration: 20 w/v %
Chemical shift standard: 85% phosphoric acid aqueous solution (external standard) 0 ppm
$^1$H-NMR measurement conditions
Device: JEOL-ECA500
Observed nucleus: $^1$H
Observation frequency: 500.16 MHz
Measurement method: Single-plus
Pulse width: 7 μs
Wait time: 5 s
Cumulative number: 512
Solvent: CDCl$_3$
Sample concentration: 5 w %
Chemical shift standard: TMS 0.00 ppm
$^{13}$C-NMR measurement conditions
Device: Bruker Biospin Avance 600
Observed nucleus: $^{13}$C
Observation frequency: 150.9 MHz
Measurement method: Inverse gated decoupling
Pulse width: 30°
Wait time: 10 s
Cumulative number: 2,000
Solvent: CDCl$_3$ Sample concentration: 20 w/v %

Chemical shift standard: TMS 0 ppm

Measurement of polyphenylene ethers by $^{31}$P-NMR, $^1$H-NMR, and $^{13}$C-NMR described below was carried under the conditions shown above.

(A-2)

First, a precursor polyphenylene ether having the same types of units as PPE-1 was produced by the following production method.

A jacketed reactor having a capacity of 10 L and equipped with a stirrer, a thermometer, a condenser, and an oxygen supply tube that extended to the bottom of the reactor was charged with 2.9 kg of xylene, 905 g of methanol, and 1.0 kg (8.2 mol) of 2,6-dimethylphenol, and after a uniform liquid had been obtained, a solution of 26.2 g (655 mmol) of sodium hydroxide dissolved in 175 g of methanol was added, and then 20.8 g of a premix obtained by mixing 810 mg (4.1 mmol) of manganese chloride tetrahydrate and 20 g (328 mmol) of monoethanolamine for 1 hour at 50° C. under a nitrogen atmosphere was added. In addition, 20.4 g (329 mmol) of ethylene glycol and 10.6 g (82 mmol) of di-n-butylamine were added. The contents of the reactor were vigorously stirred while oxygen was blown therein at a rate of 200 NmL/min and a reaction was carried out for 3 hours while maintaining a reaction temperature of 40° C. Thereafter, the rate of oxygen blowing was changed to 80 NmL/min and the reaction temperature was lowered to 30° C., and the supply of oxygen was stopped once 5 hours had passed from the start of the reaction. Next, 600 g of the reaction mixture was removed, and 280 g of methanol was added thereto. Precipitated polymer was suction filtered and was subsequently washed twice with 1 L of methanol and suction filtered. The resultant polymer was dispersed in a solution of 2.9 g of sodium pyrophosphate and 1.9 g of sodium hydrosulfite dissolved in 500 mL of deionized water, and was treated for 10 minutes at 80° C. under stirring. Polymer obtained by suction filtration was washed twice with 1 L of deionized water and suction filtered. The wet polymer was dried under reduced pressure for 5 hours at 150° C. to obtain 110 g of a polyphenylene ether in powder form.

The precursor polyphenylene ether obtained by the production method described above included the same types of units as PPE-1 but had a reduced viscosity of 0.47 dL/g and a number of N,N-dibutylaminomethyl groups per 100 units of 3.6.

Next, a tumbler mixer was used to mix 100 parts by mass of the precursor polyphenylene ether described above and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A) a polyphenylene ether component (A-3). Thereafter, vacuum drying was carried out for 4 hours at 60° C. to obtain a powder of (A) the polyphenylene ether (A-3).

It was possible to identify the obtained (A) polyphenylene ether (A-3) by $^{31}$P-NMR (single plus method) and $^1$H-NMR. The added amount of reactive compound at methyl groups was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of the previously shown chemical formulae (10) and (11) that were included per 100 monomer units in the polyphenylene ether chain was 3.4.

Moreover, the added amount of reactive compound at terminal hydroxy groups could be determined by the previously shown equation (2) using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (12) that were included per 100 monomer units forming the polyphenylene ether was 0.03. Moreover, it was confirmed that a new doublet peak did not arise at 3.5 ppm to 5.5 ppm in $^1$H-NMR.

The ratio of chemical formula (10) relative to chemical formula (11) was determined to be 5.0 mol % by calculating the ratio of an integrated value for a peak at 34 ppm to 36 ppm in $^{31}$P-NMR that originates from chemical formula (10) relative to an integrated value for a peak at 38 ppm to 42 ppm in $^{31}$P-NMR that originates from chemical formula (11).

(A-3)

A tumbler mixer was used to mix 100 parts by mass of precursor polyphenylene ether (PPE-2) and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A) a polyphenylene ether component (A-3). Thereafter, vacuum drying was carried out for 4 hours at 60° C. to obtain a powder of (A) the polyphenylene ether (A-3).

It was possible to identify the obtained polyphenylene ether (A-3) by $^{31}$P-NMR (single plus method) and $^1$H-NMR. The added amount of reactive compound at methyl groups was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of chemical formulae (10) and (11), shown below, that were included per 100 monomer units in the polyphenylene ether chain was 0.25.

Moreover, the obtained (A) polyphenylene ether (A-3) could be identified by $^{13}$C-NMR, and the added amount of reactive compound could be determined by the previously shown equation (2) using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of the previously shown chemical formula (12) that were included per 100 monomer units forming the polyphenylene ether was 4.9. Moreover, it was confirmed that a new doublet peak did not arise at 3.5 ppm to 5.5 ppm in $^1$H-NMR.

The ratio of chemical formula (10) relative to chemical formula (11) was determined to be 27 mol % by calculating the ratio of an integrated value for a peak at 34 ppm to 36 ppm in $^{31}$P-NMR that originates from chemical formula (10)

relative to an integrated value for a peak at 38 ppm to 42 ppm in $^{31}$P-NMR that originates from chemical formula (11).

(A-4)

A tumbler mixer was used to mix 100 parts by mass of PPE-3 and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A) a polyphenylene ether component (A-4). Thereafter, vacuum drying was carried out for 4 hours at 60° C. to obtain a powder of (A) the polyphenylene ether (A-4).

It was possible to identify the obtained (A) polyphenylene ether (A-4) by $^{31}$P-NMR (single plus method) and $^1$H-NMR. The added amount of reactive compound at methyl groups was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of chemical formulae (10) and (11), shown below, that were included per 100 monomer units in the polyphenylene ether chain was 0.25.

Moreover, the added amount of reactive compound at terminal hydroxy groups could be determined by equation (2), shown below, using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (12), shown below, that were included per 100 monomer units forming the polyphenylene ether was 0.03. Moreover, it was confirmed that a new doublet peak did not arise at 3.5 ppm to 5.5 ppm in $^1$H-NMR.

Number of additions of reactive compound per 100 monomer units forming polyphenylene ether=(Number of terminal OH groups per 100 monomer units forming precursor polyphenylene ether)×{[A]/([A]+[B])} (2)

The ratio of chemical formula (10) relative to chemical formula (11) was determined to be 27 mol % by calculating the ratio of an integrated value for a peak at 34 ppm to 36 ppm in $^{31}$P-NMR that originates from chemical formula (10) relative to an integrated value for a peak at 38 ppm to 42 ppm in $^{31}$P-NMR that originates from chemical formula (11).

(A-5)

First, a brominated polyphenylene ether was produced by the following production method.

A 10 L jacketed reactor was charged with 100 parts by mass of PPE-1, 2.0 L of chloroform was added, and stirring was performed at room temperature for 5 minutes under a nitrogen atmosphere. Thereafter, 15.0 parts by mass of N-bromosuccinimide and 2.0 parts by mass of azobisisobutyronitrile were added and a reaction was carried out for 8 hours under reflux. The resultant reaction liquid was cooled to room temperature, 3 L of n-hexane was subsequently added, and a brominated polyphenylene ether was solidified to yield a slurry. Wet pulverization of the slurry was carried out using a 1 mm lattice slit in a Disintegrator (product name) produced by Komatsu Zenoah Co. and solid-liquid separation of the pulverized slurry was carried out while continuously supplying the pulverized slurry into a Young filter-type vacuum filter. Rinse washing was performed with methanol in an amount equivalent to three times the weight of polyphenylene ether after drying on the Young filter-type vacuum filter. After this washing, the resultant polyphenylene ether particles were dried.

In the brominated polyphenylene ether obtained by the production method described above, only side chain methyl groups and terminal methyl groups were brominated with a bromination rate of 4.3 groups per 100 monomer units forming the polyphenylene ether.

A 10 L jacketed reactor was charged with 100 parts by mass of the brominated polyphenylene ether and 500 parts by mass of 9,10-dihydro-9-oxa-10-phosphaphenanthrene-10-oxide (produced by Sanko Co., Ltd.) and was stirred for 24 hours at 160° C. to carry out a reaction. The resultant reaction liquid was cooled to room temperature, 2 L of methanol was added, and the reacted material was solidified to yield a slurry. The slurry was filtered to obtain a powder that was then vacuum dried for 4 hours to yield a powder of a polyphenylene ether (A-5).

It was possible to identify the obtained polyphenylene ether (A-5) by $^{31}$P-NMR (single plus method) and $^1$H-NMR. The added amount of reactive compound at methyl groups was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of chemical formulae (10) and (11), shown below, that were included per 100 monomer units in the polyphenylene ether chain was 4.0.

When the added amount of reactive compound at terminal hydroxy groups was measured by $^{13}$C-NMR as previously described, the structure of chemical formula (12) could not be confirmed.

The ratio of chemical formula (10) relative to chemical formula (11) was determined to be 570 mol % by calculating an integrated value for a peak at 34 ppm to 36 ppm in $^{31}$P-NMR that originates from chemical formula (10) relative to an integrated value for a peak at 38 ppm to 42 ppm in $^{31}$P-NMR that originates from chemical formula (11).

(A-6)

A tumbler mixer was used to mix 100 parts by mass of PPE-1 and 1.5 parts by mass of dioctyl phosphonate (produced by Johoku Chemical Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract (A) a polyphenylene ether component (A-6). Thereafter, vacuum drying was carried out for 4 hours at 60° C. to obtain a powder of (A) the polyphenylene ether (A-6).

It was possible to identify the obtained (A) polyphenylene ether (A-6) by $^{31}$P-NMR (single plus method) and $^1$H-NMR. The added amount of reactive compound was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of chemical formulae (13)

and (14) that were included per 100 monomer units in the polyphenylene ether was 0.25.

Moreover, the obtained (A) polyphenylene ether (A-6) could be identified by $^{13}$C-NMR, and the added amount of reactive compound could be determined by the previously shown equation (2) using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (15) that were included per 100 monomer units forming the polyphenylene ether was 0.25. Moreover, it was confirmed that a new doublet peak did not arise at 3.5 ppm to 5.5 ppm in $^1$H-NMR.

The ratio of chemical formula (13) relative to chemical formula (14) was determined to be 25 mol % by calculating the ratio of an integrated value for a peak at 32 ppm to 38 ppm in $^{31}$P-NMR that originates from chemical formula (13) relative to an integrated value for a peak at 38 ppm to 45 ppm in $^{31}$P-NMR that originates from chemical formula (14).

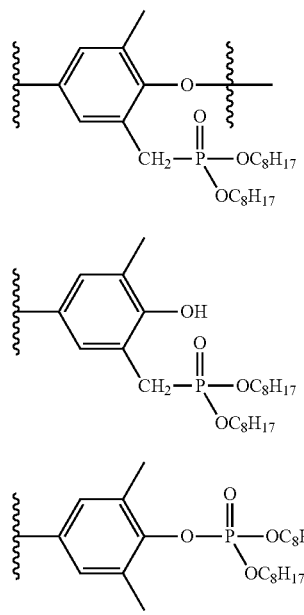

(13)

(14)

(15)

(A-7)
A tumbler mixer was used to mix 100 parts by mass of precursor polyphenylene ether (PPE-1) and 1.5 parts by mass of diphenylphosphine oxide (produced by Tokyo Chemical Industry Co., Ltd.). The resultant powder mixture was fed from a first raw material feeding inlet of a twin screw extruder (ZSK-25 produced by Coperion GmbH) and was melt-kneaded at a barrel temperature of 300° C. and a screw rotation speed of 300 rpm to obtain a resin composition in the form of pellets.

The pellets were dissolved in chloroform and were then reprecipitated using methanol to extract a polyphenylene ether component (A-7). Thereafter, vacuum drying was carried out for 4 hours at 60° C. to obtain a powder of the polyphenylene ether (A-7).

It was possible to identify the obtained polyphenylene ether (A-7) by $^{31}$P-NMR (single plus method) and $^1$H-NMR.

The added amount of reactive compound was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of chemical formulae (16) and (17) that were included per 100 monomer units in the polyphenylene ether was 0.25.

Moreover, the obtained (A) polyphenylene ether (A-7) could be identified by $^{13}$C-NMR, and the added amount of reactive compound could be determined by the previously shown equation (2) using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (18), shown below, that were included per 100 monomer units forming the polyphenylene ether was 0.04. Moreover, it was confirmed that a new doublet peak did not arise at 3.5 ppm to 5.5 ppm in $^1$H-NMR.

The ratio of chemical formula (16) relative to chemical formula (17) was determined to be 25 mol % by calculating the ratio of an integrated value for a peak at 32 ppm to 38 ppm in $^{31}$P-NMR that originates from chemical formula (16) relative to an integrated value for a peak at 38 ppm to 45 ppm in $^{31}$P-NMR that originates from chemical formula (17).

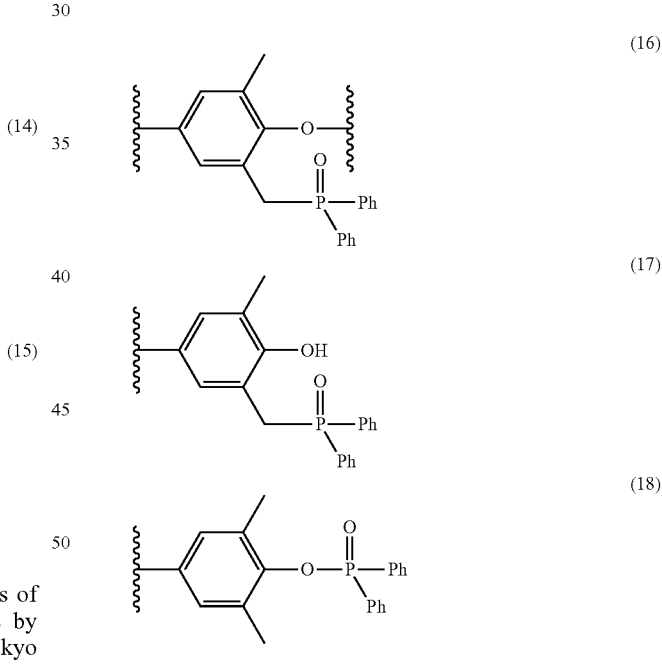

(16)

(17)

(18)

(A-8)
A solution was prepared by dissolving 100 parts by mass of PPE-1, 0.1 parts by mass of N-hydroxyphthalimide (produced by Tokyo Chemical Industry Co., Ltd.), 0.5 parts by mass of triethylamine (produced by Tokyo Chemical Industry Co., Ltd.), and 1.0 parts by mass of methanesulfonyl chloride (produced by Tokyo Chemical Industry Co., Ltd.) in 1 L of chloroform and was stirred for 5 hours at 60° C. The obtained reaction solution was neutralized with sodium hydrogen carbonate aqueous solution and was subjected to a liquid separation operation to obtain an organic layer. Methanol was gradually added to the obtained organic layer to cause precipitation of a PPE component that was then filtered off and dried to extract (A) a polyphenylene ether component (A-8). Thereafter, vacuum drying was carried out for 4 hours at 60° C. to obtain a powder of (A) the polyphenylene ether (A-8).

It was possible to identify the obtained (A) polyphenylene ether (A-8) by $^1$H-NMR and $^{13}$C-NMR. The added amount of reactive compound at methyl groups was determined by dividing an integrated value for a peak appearing at 2.8 ppm to 3.6 ppm in $^1$H-NMR by an integrated value for a peak at 6.0 ppm to 7.0 ppm in $^1$H-NMR that originates from aromatic rings of the polyphenylene ether. It was confirmed that the total number of structures of chemical formulae (19) and (20) that were included per 100 monomer units in the polyphenylene ether was 0.3.

Moreover, the added amount of reactive compound at terminal hydroxy groups could be determined by the previously shown equation (2) using an integrated value [A] for a peak at 146.4 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (21), shown below, that were included per 100 monomer units forming the polyphenylene ether was 0.1. Moreover, it was confirmed that a new doublet peak did not arise at 3.5 ppm to 5.5 ppm in $^1$H-NMR.

The ratio of chemical formula (19) relative to chemical formula (20) was determined to be 20 mol % by calculating the ratio of an integrated value for a peak at 34 ppm to 36 ppm in $^{31}$P-NMR that originates from chemical formula (19) relative to an integrated value for a peak at 38 ppm to 42 ppm in $^{31}$P-NMR that originates from chemical formula (20).

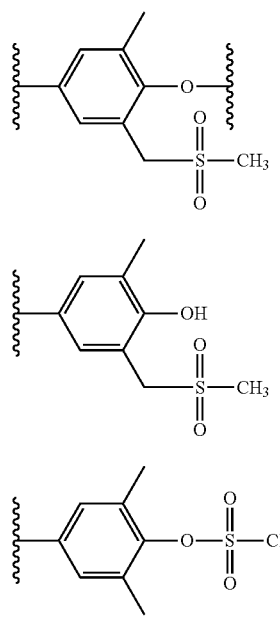

(A-9)

PPE-1 was fed from a first raw material feeding inlet of a twin screw extruder (ZSK-25 produced by Coperion GmbH), was melt-kneaded with a barrel temperature of 300° C. and a screw rotation speed of 300 rpm, and was pelletized. The obtained PPE pellets were analyzed to confirm a structure in which dibutylamine had been eliminated. A tumbler mixer was used to mix 100 parts by mass of these PPE pellets and 1.2 parts by mass of 9,10-dihydro-9-oxa-10-phosphaphenanthrene-10-oxide (produced by Sanko Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract a polyphenylene ether component (A-9). Thereafter, vacuum drying was carried out for 4 hours at 60° C. to obtain a powder of the polyphenylene ether (A-9).

As a result of identification of the obtained polyphenylene ether (A-9) by $^1$H-NMR, it was confirmed that the polyphenylene ether (A-9) was formed from structures of chemical formulae (22) and (23) without addition of low molecular weight compound at methyl groups in the monomer units. Moreover, it was confirmed by $^{13}$C-NMR that low molecular weight compound had not reacted with terminal OH groups.

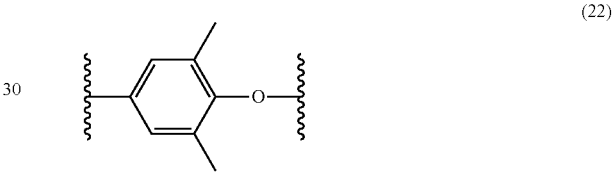

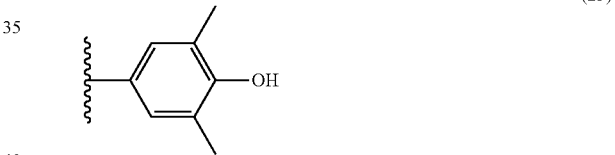

(A-10)

A tumbler mixer was used to mix 100 parts by mass of PPE-1 and 1.6 parts by mass of stearyl acrylate (produced by Tokyo Chemical Industry Co., Ltd.). The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

These pellets were dissolved in chloroform. Thereafter, purified water was added, an organic layer and an aqueous layer were separated by a liquid separation operation, and the organic layer was collected. A PPE component was reprecipitated from the organic layer using methanol to extract a polyphenylene ether component (A-10). Thereafter, vacuum drying was carried out for 4 hours at 60° C. to obtain a powder of A-10.

It was possible to identify the obtained A-10 by $^1$H-NMR. It was confirmed that the number of structures of chemical formula (24) that were included per 100 monomer units in the polyphenylene ether was 0.4 by dividing an integrated value for a peak appearing at 2.5 ppm to 4.0 ppm in $^1$H-NMR by an integrated value for a peak at 6.0 ppm to 7.0 ppm in $^1$H-NMR that originates from aromatic rings in the polyphenylene ether.

(24)

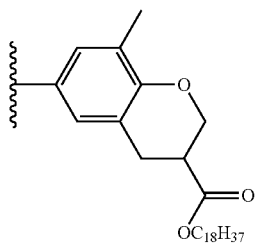

(A-11)

A tumbler mixer was used to mix 100 parts by mass of PPE-1 and 10 parts by mass of styrene. The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

These pellets were dissolved in chloroform and were then reprecipitated using methanol to extract a polyphenylene ether component. Thereafter, vacuum drying was carried out for 4 hours at 60° C. to obtain a powder of A-11.

It was possible to identify the obtained A-11 by $^1$H-NMR. It was confirmed that the number of structures of chemical formula (25) that were included per 100 monomer units in the polyphenylene ether was 0.4 by dividing an integrated value for a peak appearing at 2.5 ppm to 4.0 ppm in $^1$H-NMR by an integrated value for a peak at 6.0 ppm to 7.0 ppm in $^1$H-NMR that originates from aromatic rings in the polyphenylene ether.

(25)

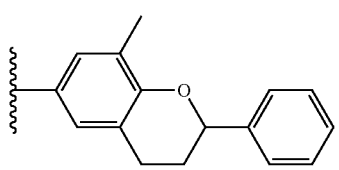

(A-12)

A tumbler mixer was used to mix 100 parts by mass of PPE-1 and 5.0 parts by mass of maleic anhydride. The resultant powder mixture was fed from a first raw material feeding inlet of a twin screw extruder (ZSK-25 produced by Coperion GmbH) and was melt-kneaded with a barrel temperature of 300° C. and a screw rotation speed of 300 rpm to obtain a resin composition in the form of pellets.

The pellets were dissolved in chloroform and were then reprecipitated using methanol to extract a modified polyphenylene ether component. Thereafter, vacuum drying was carried out for 4 hours at 60° C. to obtain a powder of A-12.

It was possible to identify the obtained A-12 by $^1$H-NMR. It was confirmed that the number of structures of chemical formula (26) that were included per 100 monomer units in the polyphenylene ether was 0.3 by dividing an integrated value for a peak appearing at 2.5 ppm to 4.0 ppm in $^1$H-NMR by an integrated value for a peak at 6.0 ppm to 7.0 ppm in $^1$H-NMR that originates from aromatic rings in the polyphenylene ether.

(26)

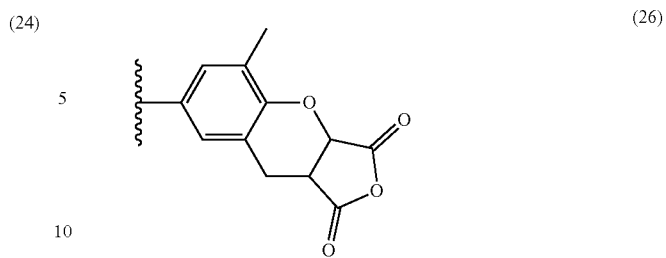

(A-13)

A tumbler mixer was used to mix 100 parts by mass of precursor polyphenylene ether (PPE-1) and 1.5 parts by mass of dioleyl hydrogen phosphite (produced by Johoku Chemical Co., Ltd.). The resultant powder mixture was fed from a first raw material feeding inlet of a twin screw extruder (ZSK-25 produced by Coperion GmbH) and was melt-kneaded at a barrel temperature of 300° C. and a screw rotation speed of 300 rpm to obtain a resin composition in the form of pellets.

The pellets were dissolved in chloroform and were then reprecipitated using methanol to extract a polyphenylene ether component (A-13). Thereafter, vacuum drying was carried out for 4 hours at 60° C. to obtain a powder of the polyphenylene ether (A-13).

It was possible to identify the obtained polyphenylene ether (A-13) by $^{31}$P-NMR (single plus method), $^{13}$C-NMR, and MALDI-TOF/MS. The added amount of reactive compound could be determined by the previously shown equation (2) using an integrated value [A] for a peak at 146.3 ppm in $^{13}$C-NMR (carbon adjacent to oxygen atom of ether bond formed through addition of reactive compound at OH group) and an integrated value [B] for 145.4 ppm in $^{13}$C-NMR (carbon adjacent to OH group). It was confirmed that the number of structures of chemical formula (27), shown below, that were included per 100 monomer units forming the polyphenylene ether was 0.03. An olefin doublet peak that originates from an oleyl group was confirmed at 4.2 ppm in $^1$H-NMR.

Note that measurement by $^{31}$P-NMR, $^{13}$C-NMR, MALDI-TOF/MS, and $^1$H-NMR was performed with the same conditions as previously described.

(27)

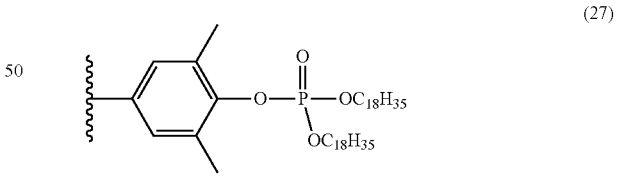

MALDI-TOF/MS measurement conditions
Device: Bruker ultrafleXtreme
Laser: smartbeam-II
Detector format: Reflector
Ion detection: Positive ion (Positive mode)
Cumulative number: 2,000
Matrix: 10 mg/mL of DCTB (trans-2-[3-(4-tert-butylphenyl)-2-methyl-2-propylidenl] in THF
Cationization agent: 5 mg/mL of AgTFA in THF
Scan range: m/z 2,200 to 20,000
Sample: 1 mg/mL in THF
<(B) Antioxidant>

(B-1)

Phosphoric antioxidant (chemical name: 3,9-bis(2,6-di-tert-butyl-4-methylphenoxy)-2,4,8,10-tetraoxa-3,9-diphosphasp iro[5,5]undecane; produced by ADEKA Corporation; product name: ADK STAB PEP-36® (ADK STAB PEP-36 is a registered trademark in Japan, other countries, or both)) (hereinafter, also referred to as "B-1") (B-2)

Phosphoric antioxidant (chemical name: tris(2,4-di-tert-butylphenyl) phosphite; produced by BASF Corporation; product name: Irgafos 168® (Irgafos 168 is a registered trademark in Japan, other countries, or both)) (hereinafter, also referred to as "B-2")

(B-3)

Sulfuric antioxidant (chemical name: 2,6-di-tert-butyl-4-(4,6-bis(octylthio)-1,3,5-triazin-2-ylamino)phenol; produced by BASF Corporation; product name: Irganox 565® (Irganox 565 is a registered trademark in Japan, other countries, or both))

<(C) Styrenic Resin>

General purpose polystyrene (produced by Asahi Kasei Chemicals Corporation; product name: Polystyrene 680® (Polystyrene 680 is a registered trademark in Japan, other countries, or both)) (hereinafter, also referred to as "GPP S")

<(D) Elastomer Component>

Three-block type hydrogenated block copolymer having a weight average molecular weight of 71,200 and including a polystyrene block with a bound styrene content of 32 mass % and a hydrogenated butadiene block with a percentage hydrogenation of 98% (hereinafter, referred to as "Elastomer")

Comparative Example 1

In Comparative Example 1, a resin composition was obtained by performing feeding from a first raw material feeding inlet of a twin screw extruder (ZSK-25 produced by Coperion GmbH) in accordance with the composition shown in Table 1 and then performing melt-kneading with a barrel temperature of 300° C. and a screw rotation speed of 300 rpm. Physical properties of the obtained resin composition are shown in Table 1.

Examples 1 to 16 and Comparative Examples 2 to 9

Resin compositions shown in Table 1 were obtained by performing melt-kneading by the same method as in Comparative Example 1. Physical properties of the obtained resin compositions are shown in Table 1.

TABLE 1

| [Composition (mass %)] | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| (Polyphenylene ether) | | | | | | | | | |
| PPE-1 | 70 | 70 | 70 | 70 | | | | | |
| A-1 | | | | | | | | | |
| A-2 | | | | | | | | | |
| A-3 | | | | | | | | | |
| A-4 | | | | | | | | | |
| A-5 | | | | | | | | | |
| A-6 | | | | | | | | | |
| A-7 | | | | | | | | | |
| A-8 | | | | | | | | | |
| A-9 | | | | | | 70 | | | |
| A-10 | | | | | | | 70 | | |
| A-11 | | | | | | | | 70 | |
| A-12 | | | | | | | | | 70 |
| A-13 | | | | | | | | | | 70 |
| ((B) Antioxidant) | | | | | | | | | |
| B-1 | | 2 | | | | | | | 0.6 |
| B-2 | | | 2 | | | | | | |
| B-3 | | | | 2 | | | | | |
| ((C) Polystyrene resin) | | | | | | | | | |
| GPPS | 25 | 23 | 23 | 23 | 25 | 25 | 25 | 25 | 24.4 |
| ((D) Elastomer component) | | | | | | | | | |
| Elastomer | 5 | 5 | 5 | 5 | 5 | 5 | 5 | 5 | 5 |
| Total (mass %) | 100 | 100 | 100 | 100 | 100 | 100 | 100 | 100 | 100 |
| Parts by mass of (B) component per 100 parts by mass of (A) component | — | 2.86 | 2.86 | 2.86 | — | — | — | — | 0.86 |
| (Physical properties) | | | | | | | | | |
| HDT (° C.) | 146 | 144 | 144 | 143 | 148 | 145 | 147 | 148 | 140 |
| MFR (280° C./10 kg) (g/10 min) | 37 | 39 | 39 | 42 | 30 | 35 | 34 | 35 | 82 |
| Shaped article external appearance | Poor | Poor | Poor | Good | Poor | Good | Good | Good | Good |

TABLE 1-continued

| Heat aging resistance properties (135° C.) | | | | | | | | |
|---|---|---|---|---|---|---|---|---|
| Tensile strength (0 hr) (MPa) | 77 | 74 | 73 | 73 | 80 | 75 | 77 | 76 | 70 |
| Tensile strength (500 hr) (MPa) | 42 | 52 | 50 | 60 | 65 | 63 | 62 | 60 | 55 |
| Tensile strength (1000 hr) (MPa) | 31 | 36 | 32 | 55 | 50 | 54 | 57 | 55 | 46 |
| Tensile strength (1500 hr) (MPa) | 21 | 32 | 25 | 50 | 36 | 53 | 52 | 50 | 42 |
| Tensile strength maintenance rate (%) | 27 | 43 | 34 | 68 | 45 | 71 | 68 | 66 | 60 |

| [Composition (mass %)] | Example 1 | Example 2 | Example 3 | Example 4 | Example 5 | Example 6 | Example 7 | Example 8 |
|---|---|---|---|---|---|---|---|---|
| (Polyphenylene ether) | | | | | | | | |
| PPE-1 | | | | | | | | |
| A-1 | 70 | | | | | | | |
| A-2 | | 70 | | | | | | |
| A-3 | | | 70 | | | | | |
| A-4 | | | | 70 | | | | |
| A-5 | | | | | 70 | | | |
| A-6 | | | | | | 70 | | |
| A-7 | | | | | | | 70 | |
| A-8 | | | | | | | | 70 |
| A-9 | | | | | | | | |
| A-10 | | | | | | | | |
| A-11 | | | | | | | | |
| A-12 | | | | | | | | |
| A-13 | | | | | | | | |
| ((B) Antioxidant) | | | | | | | | |
| B-1 | | | | | | | | |
| B-2 | | | | | | | | |
| B-3 | | | | | | | | |
| ((C) Polystyrene resin) | | | | | | | | |
| GPPS | 25 | 25 | 25 | 25 | 25 | 25 | 25 | 25 |
| ((D) Elastomer component) | | | | | | | | |
| Elastomer | 5 | 5 | 5 | 5 | 5 | 5 | 5 | 5 |
| Total (mass %) | 100 | 100 | 100 | 100 | 100 | 100 | 100 | 100 |
| Parts by mass of (B) component per 100 parts by mass of (A) component | 0 | 0 | 0 | 0 | 0 | 0 | 0 | 0 |
| (Physical properties) | | | | | | | | |
| HDT (° C.) | 144 | 135 | 135 | 144 | 143 | 153 | 143 | 150 |
| MFR (280° C./10 kg) (g/10 min) | 70 | 90 | 150 | 70 | 65 | 55 | 80 | 50 |
| Shaped article external appearance | Good | Good | Good | Good | Good | Good | Good | Good |
| Heat aging resistance properties (135° C.) | | | | | | | | |
| Tensile strength (0 hr) (MPa) | 75 | 65 | 50 | 75 | 78 | 75 | 73 | 76 |
| Tensile strength (500 hr) (MPa) | 77 | 63 | 47 | 77 | 70 | 76 | 70 | 72 |
| Tensile strength (1000 hr) (MPa) | 73 | 62 | 45 | 75 | 66 | 72 | 67 | 65 |
| Tensile strength (1500 hr) (MPa) | 65 | 60 | 39 | 65 | 59 | 68 | 62 | 63 |
| Tensile strength maintenance rate (%) | 87 | 92 | 78 | 87 | 76 | 91 | 85 | 83 |

| [Composition (mass %)] | Example 9 | Example 10 | Example 11 | Example 12 | Example 13 | Example 14 | Example 15 | Example 16 |
|---|---|---|---|---|---|---|---|---|
| (Polyphenylene ether) | | | | | | | | |
| PPE-1 | | | | | | | | |
| A-1 | 70 | 70 | | | | 70 | 80 | 60 |
| A-2 | | | | | | | | |
| A-3 | | | | | | | | |

TABLE 1-continued

| | | | | | | | | |
|---|---|---|---|---|---|---|---|---|
| A-4 | | | | | | | | |
| A-5 | | | | | | | | |
| A-6 | | 70 | 70 | 70 | | | | |
| A-7 | | | | | | | | |
| A-8 | | | | | | | | |
| A-9 | | | | | | | | |
| A-10 | | | | | | | | |
| A-11 | | | | | | | | |
| A-12 | | | | | | | | |
| A-13 | | | | | | | | |
| ((B) Antioxidant) | | | | | | | | |
| B-1 | 0.6 | 2.5 | 0.6 | | | | 0.6 | 0.6 |
| B-2 | | | | 0.6 | | 0.6 | | |
| B-3 | | | | | 0.6 | | | |
| ((C) Polystyrene resin) | | | | | | | | |
| GPPS | 24.4 | 22.5 | 24.4 | 24.4 | 24.4 | 24.4 | 14.4 | 34.4 |
| ((D) Elastomer component) | | | | | | | | |
| Elastomer | 5 | 5 | 5 | 5 | 5 | 5 | 5 | 5 |
| Total (mass %) | 100 | 100 | 100 | 100 | 100 | 100 | 100 | 100 |
| Parts by mass of (B) component per 100 parts by mass of (A) component | 0.86 | 3.57 | 0.86 | 0.86 | 0.86 | 0.86 | 0.75 | 1.00 |
| (Physical properties) | | | | | | | | |
| HDT (° C.) | 146 | 140 | 150 | 150 | 151 | 145 | 160 | 133 |
| MFR (280° C./10 kg) (g/10 min) | 82 | 90 | 58 | 63 | 60 | 80 | 72 | 93 |
| Shaped article external appearance | Good | Good | Good | Good | Good | Good | Good | Good |
| Heat aging resistance properties (135° C.) | | | | | | | | |
| Tensile strength (0 hr) (MPa) | 78 | 65 | 72 | 73 | 75 | 78 | 90 | 64 |
| Tensile strength (500 hr) (MPa) | 80 | 62 | 74 | 69 | 73 | 80 | 85 | 62 |
| Tensile strength (1000 hr) (MPa) | 81 | 60 | 70 | 69 | 70 | 77 | 80 | 61 |
| Tensile strength (1500 hr) (MPa) | 72 | 57 | 68 | 68 | 68 | 70 | 76 | 58 |
| Tensile strength maintenance rate (%) | 92 | 88 | 94 | 93 | 91 | 90 | 84 | 91 |

As shown in Table 1, it was possible to obtain polyphenylene ethers and resin compositions having excellent heat aging resistance properties through Examples 1 to 16.

Moreover, it can be seen that in the case of Examples 1, 2, 3, 7, 8, 11, 12, and 13 in which (A) a polyphenylene ether obtained using 9,10-dihydro-9-oxa-10-phosphaphenanthrene-10-oxide was included, and Example 5 in which (A) a polyphenylene ether obtained using diphenylphosphine oxide was included, it was possible to improve fluidity in melt-kneading of the resin composition.

INDUSTRIAL APPLICABILITY

According to this disclosure, it is possible to obtain a polyphenylene ether and a resin composition containing the polyphenylene ether that have excellent heat aging resistance properties and can, therefore, be used in various applications for automobiles, household appliances, office machines, industrial goods, and so forth. In particular, the polyphenylene ether and resin composition thereof can be effectively used in automotive components for which fluidity and high heat aging resistance are required, such as in shaped articles for reflecting component applications.

The invention claimed is:

1. A polyphenylene ether comprising
either or both of a structural unit represented by chemical formula (1) and a structural unit represented by chemical formula (2); and
a structural unit represented by chemical formula (3),

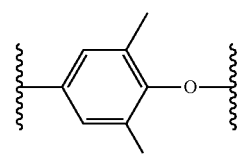

(1)

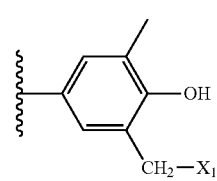

(2)

wherein $X_1$ in chemical formulae (1) and (2) is a group selected from the group consisting of

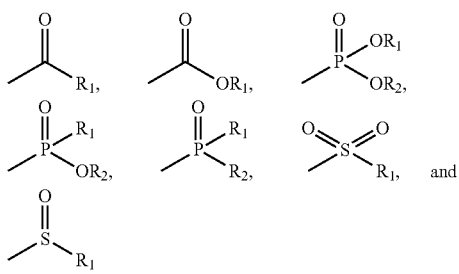

where $R_1$ and $R_2$ in $X_1$ are each, independently of one another, a substituent having a carbon number of 1 or more,

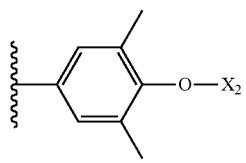
(3)

and $X_2$ in chemical formula (3) is a group selected from the group consisting of

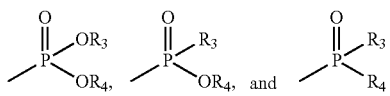

where $R_3$ and $R_4$ in $X_2$ are each, independently of one another, a group selected from the group consisting of a hydrogen atom, an alkyl group, an aryl group, an alkylamino group, and an arylamino group, $R_3$ and $R_4$ may form a cyclic structure through bonding of carbon atoms included therein, and chemical formula (3) does not include an unsaturated double bond other than an aromatic ring unsaturated double bond.

2. The polyphenylene ether according to claim 1, wherein $X_1$ is a group selected from the group consisting of

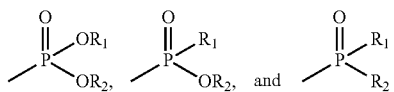

in chemical formulae (1) and (2).

3. The polyphenylene ether according to claim 1, wherein 0.01 structural units to 10.0 structural units selected from the group consisting of chemical formulae (1), (2), and (3) are included per 100 monomer units forming the polyphenylene ether.

4. The polyphenylene ether according to claim 1, wherein a ratio of structural units represented by chemical formula (1) relative to structural units represented by chemical formula (2) is 0 mol% to 30 mol%.

5. The polyphenylene ether according to claim 2, wherein 0.01 structural units to 10.0 structural units selected from the group consisting of chemical formulae (1), (2), and (3) are included per 100 monomer units forming the polyphenylene ether.

6. The polyphenylene ether according to claim 2, wherein a ratio of structural units represented by chemical formula (1) relative to structural units represented by chemical formula (2) is 0 mol% to 30 mol%.

7. The polyphenylene ether according to claim 3, wherein a ratio of structural units represented by chemical formula (1) relative to structural units represented by chemical formula (2) is 0 mol% to 30 mol%.

8. The polyphenylene ether according to claim 2, wherein 0.01 structural units to 10.0 structural units selected from the group consisting of chemical formulae (1), (2), and (3) are included per 100 monomer units forming the polyphenylene ether, and wherein a ratio of structural units represented by chemical formula (1) relative to structural units represented by chemical formula (2) is 0 mol% to 30 mol%.

* * * * *

UNITED STATES PATENT AND TRADEMARK OFFICE
CERTIFICATE OF CORRECTION

PATENT NO. : 10,723,840 B2
APPLICATION NO. : 16/068191
DATED : July 28, 2020
INVENTOR(S) : Chihiro Orimo et al.

It is certified that error appears in the above-identified patent and that said Letters Patent is hereby corrected as shown below:

On the Title Page

Column 1, item (30), Foreign Application Priority Data, please add the following foreign application:
June 2, 2016 (JP) 2016-111215

Column 2, item (56), FOREIGN PATENT DOCUMENTS, please make the corrections below:
On Line 7, "JP H04117452" should read "JP H04117452 A"
On Line 12, "JP 2009221387" should read "JP 2009221387 A"

Signed and Sealed this
Sixth Day of October, 2020

Andrei Iancu
*Director of the United States Patent and Trademark Office*